(12) United States Patent
Ohno et al.

(10) Patent No.: US 10,744,839 B2
(45) Date of Patent: Aug. 18, 2020

(54) ELECTROMAGNETIC SUSPENSION APPARATUS

(71) Applicant: HONDA MOTOR CO., LTD., Tokyo (JP)

(72) Inventors: Satoshi Ohno, Wako (JP); Tomoya Toyohira, Wako (JP); Takafumi Kato, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 15/978,536

(22) Filed: May 14, 2018

(65) Prior Publication Data

US 2018/0361813 A1 Dec. 20, 2018

(30) Foreign Application Priority Data

Jun. 16, 2017 (JP) .................................. 2017-119120

(51) Int. Cl.
*B60G 17/018* (2006.01)
*B60G 17/015* (2006.01)
(Continued)

(52) U.S. Cl.
CPC ....... *B60G 17/018* (2013.01); *B60G 17/0157* (2013.01); *B60G 17/0162* (2013.01); *B60G 17/06* (2013.01); *B60G 2202/42* (2013.01); *B60G 2400/202* (2013.01); *B60G 2400/204* (2013.01); *B60G 2400/40* (2013.01); *B60G 2500/10* (2013.01); *B60G 2600/17* (2013.01);
(Continued)

(58) Field of Classification Search
CPC ............ B60G 17/0157; B60G 17/0162; B60G 17/018; B60G 17/06; B60G 2202/42; B60G 2400/202; B60G 2400/204; B60G 2400/40; B60G 2500/10; B60G 2600/17; B60G 2600/26; B60G 2600/60
See application file for complete search history.

(56) References Cited

U.S. PATENT DOCUMENTS

| | | | |
|---|---|---|---|
| 9,857,776 B2 * | 1/2018 | Watai | G05D 19/02 |
| 2012/0070013 A1 * | 3/2012 | Vau | G10K 11/178 381/71.4 |
| 2014/0032044 A1 * | 1/2014 | Watai | G05D 19/02 701/36 |

FOREIGN PATENT DOCUMENTS

JP 2010-132222 A 6/2010

* cited by examiner

*Primary Examiner* — Tyler J Lee
(74) *Attorney, Agent, or Firm* — Rankin, Hill & Clark LLP

(57) ABSTRACT

Provided is an electromagnetic suspension apparatus capable of achieving both of vibration isolation performance and road holding performance. The electromagnetic suspension apparatus includes an electromagnetic actuator, an information acquisition unit that acquires information on a stroke speed of the electromagnetic actuator and a state quantity of the vehicle, a plurality of filters in which individual gain characteristics are respectively set, a filter setting unit that selectively sets a filter having a gain characteristic suitable for the state quantity of the vehicle from among the plurality of filters, a filter processing unit that performs a filtering process on a stroke speed signal using the filter set by the filter setting unit, and a drive control unit that controls driving of the electromagnetic actuator based on relationship information between the stroke speed after the filtering process and a damping force corresponding to the stroke speed.

6 Claims, 13 Drawing Sheets

(51) Int. Cl.
  *B60G 17/016* (2006.01)
  *B60G 17/06* (2006.01)
(52) U.S. Cl.
  CPC ...... *B60G 2600/26* (2013.01); *B60G 2600/60* (2013.01)

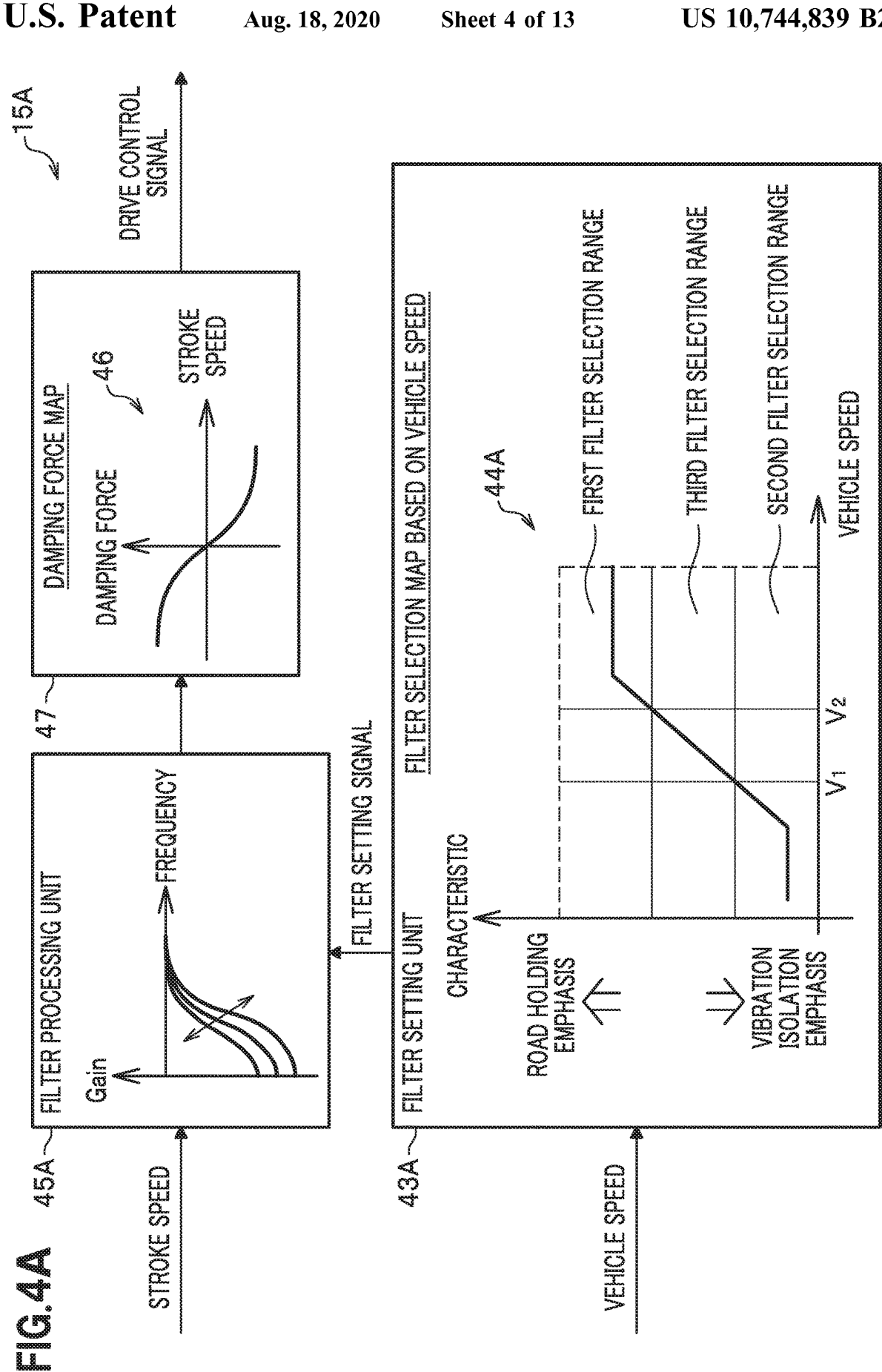

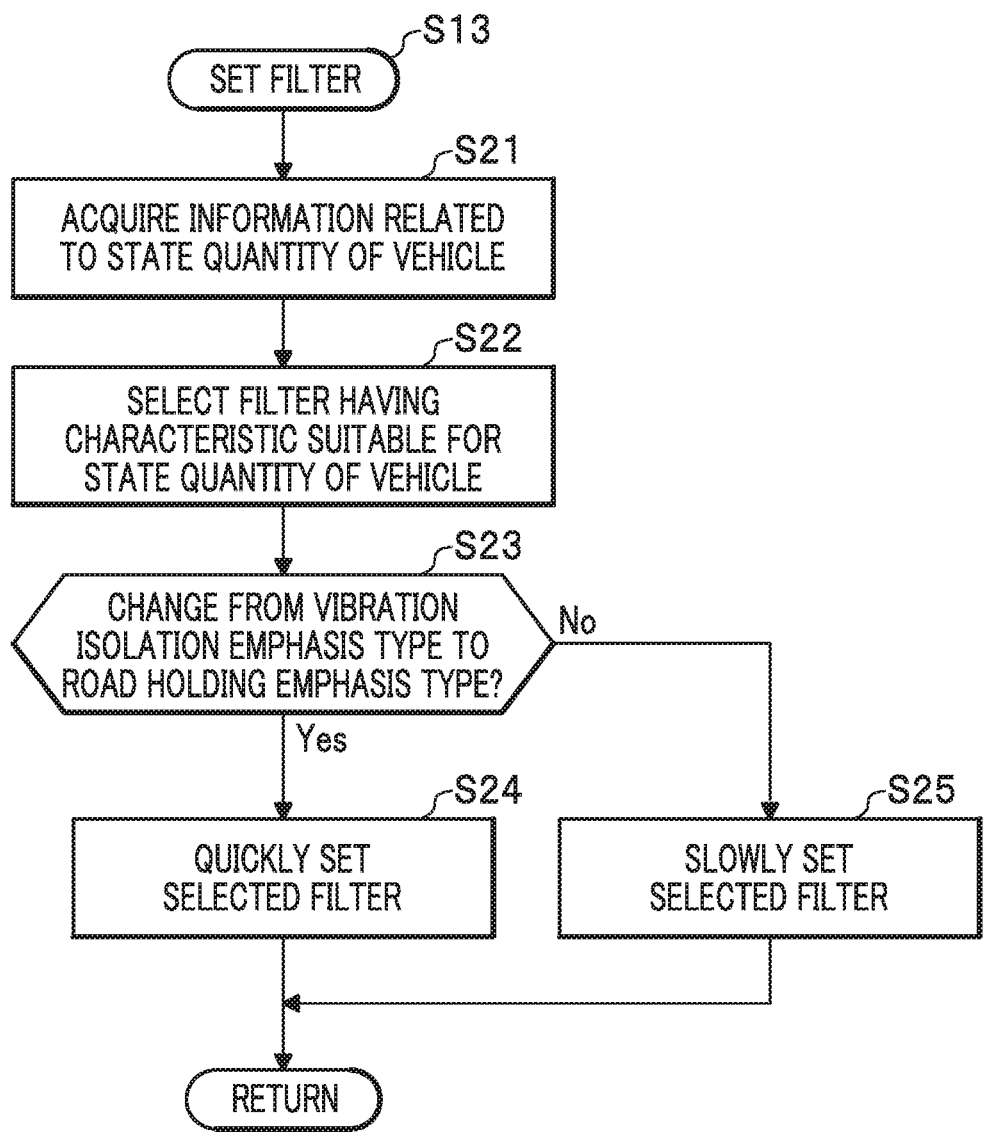

US 10,744,839 B2

ELECTROMAGNETIC SUSPENSION APPARATUS

CROSS REFERENCE TO RELATED APPLICATIONS

This application claims the foreign priority benefit under Title 35, United States Code, § 119 (a)-(d) of Japanese Patent Application No. 2017-119120, filed on Jun. 16, 2017, the disclosure of which is herein incorporated by reference in its entirety.

TECHNICAL FIELD

The present invention relates to an electromagnetic suspension apparatus including an electromagnetic actuator which is provided between a vehicle body and a wheel of a vehicle and generates a driving force related to vibration damping of the vehicle body.

BACKGROUND ART

Conventionally, there has been known an electromagnetic suspension apparatus including an electromagnetic actuator which is provided between a vehicle body and a wheel of a vehicle and generates a driving force related to vibration damping of the vehicle body by an electric motor (for example, see Japanese Patent Application Publication No. 2010-132222). The electromagnetic actuator is configured to include a ball screw mechanism in addition to the electric motor. The electromagnetic actuator operates to generate the driving force related to the vibration damping of the vehicle body by converting rotational motion of the electric motor into linear motion of the ball screw mechanism.

The electromagnetic suspension apparatus according to Japanese Patent Application Publication No. 2010-132222 includes a speed-damping force map which defines a correspondence relationship between a stroke speed of the electromagnetic actuator and the damping force. In the electromagnetic suspension apparatus, a target damping force corresponding to the stroke speed is calculated based on the stroke speed of the electromagnetic actuator and the speed-damping force map, and driving of the electromagnetic actuator is controlled based on the calculated target damping force and the like, so that ride comfort of the vehicle can be improved.

SUMMARY OF INVENTION

Technical Problem

Meanwhile, in the electromagnetic suspension apparatus described in Japanese Patent Application Publication No. 2010-132222, it is required to obtain vibration isolation performance in sprung members such as strut tower portion on the vehicle body side and simultaneously to obtain road holding performance in unsprung members such as lower arm and knuckle on the wheel side. However, the vibration isolation performance in the sprung member and the road holding performance in the unsprung member are in a trade-off relationship to each other. Therefore, there has been a problem that it is difficult to achieve both the performance at a high level according to a motion state of the vehicle which fluctuates every moment.

The present invention has been made in view of the above circumstances, and an object of the present invention is to provide an electromagnetic suspension apparatus capable of achieving both of vibration isolation performance in a sprung member and road holding performance in an unsprung member at a high level according to a motion state of a vehicle which fluctuates every moment.

Solution to Problem

In order to achieve the above objects, an electromagnetic suspension apparatus according to the present invention includes an electromagnetic actuator provided between a vehicle body and a wheel of a vehicle and generating a driving force related to vibration damping of the vehicle body, an information acquisition unit that acquires information on a stroke speed of the electromagnetic actuator and a state quantity of the vehicle, a plurality of filters having gain characteristics with respect to frequency and set to have gain characteristics in which a gain at a sprung resonance frequency is lower than that at an unsprung resonance frequency, a filter setting unit that selectively sets a filter having a predetermined gain characteristic from among the plurality of filters based on the state quantity of the vehicle acquired by the information acquisition unit, a filter processing unit that performs a filtering process on the stroke speed acquired by the information acquisition unit using the filter set by the filter setting unit, and a drive control unit that controls driving of the electromagnetic actuator based on the stroke speed after the filtering process by the filter processing unit and relationship information between the stroke speed after the filtering process and a damping force. The gain characteristics of the plurality of filters are set so that differences between the gain at the sprung resonance frequency and the gain at the unsprung resonance frequency are different from each other.

Advantageous Effects of Invention

According to the present invention, it is possible to achieve both of vibration isolation performance in the sprung member and road holding performance in the unsprung member at a high level according to the motion state of the vehicle which fluctuates every moment.

BRIEF DESCRIPTION OF DRAWINGS

FIG. 4A is an internal configuration diagram of the ECU included in the electromagnetic suspension apparatus according to a first embodiment;

FIG. 5B is a flowchart for explaining the operation of the electromagnetic suspension apparatus according to the embodiment of the present invention;

DESCRIPTION OF EMBODIMENTS

Figure 1:
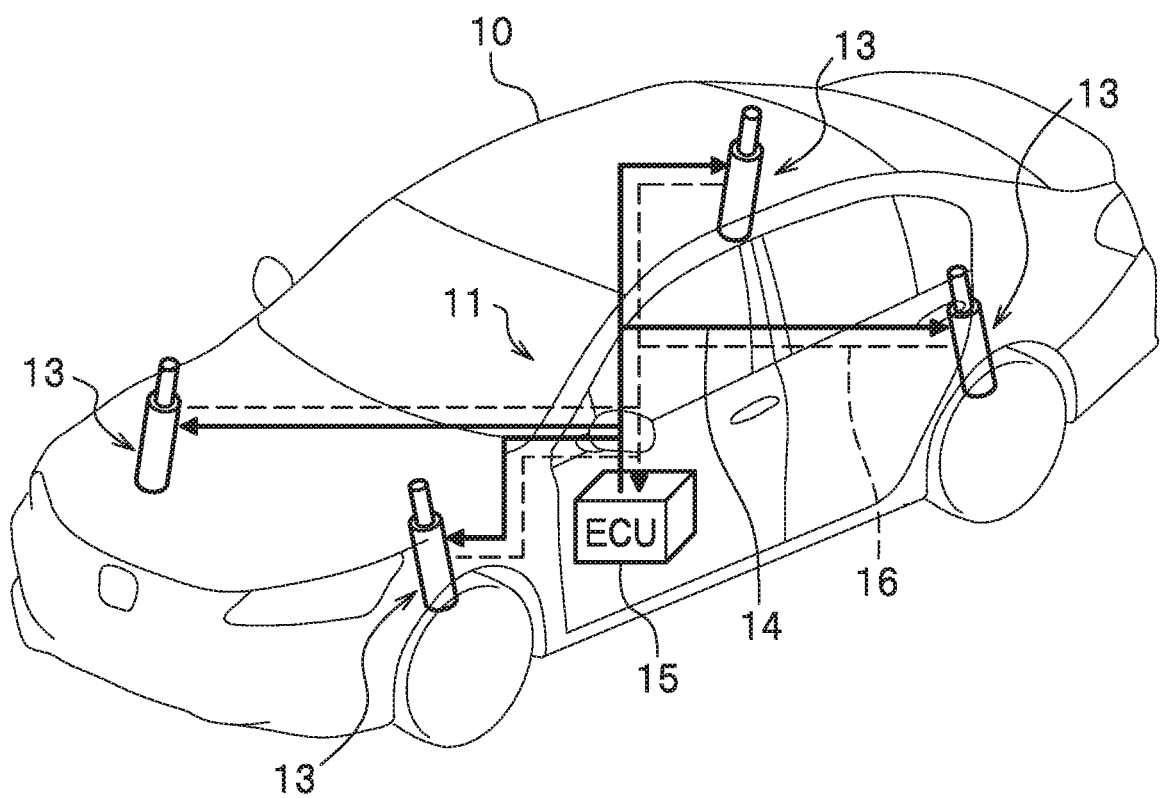
FIG. 1 is an overall configuration diagram common to an electromagnetic suspension apparatus according to a first to third embodiments of the present invention.

An electromagnetic suspension apparatus according to a first to third embodiments of the present invention will be described in detail with reference to the drawings below. In the following drawings, members having common functions are denoted by common reference numerals. In addition, the size and shape of the member may be schematically illustrated by being deformed or exaggerated for convenience of explanation.

Figure 2:
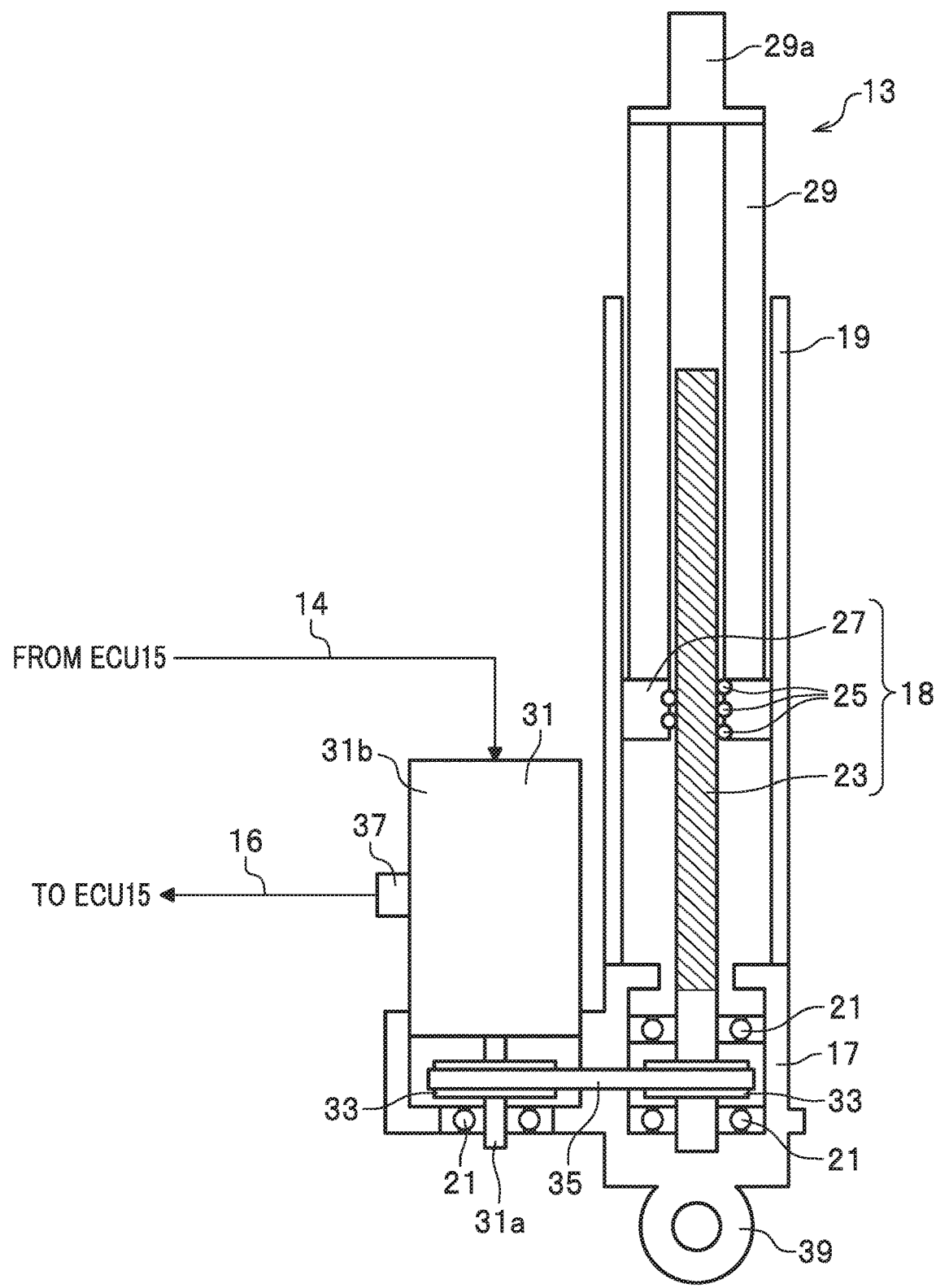
FIG. 2 is a partial cross-sectional view of an electromagnetic actuator provided in the electromagnetic suspension apparatus.

Basic Configuration Common to Electromagnetic Suspension Apparatus 11 According to First to Third Embodiments of the Present Invention First, a basic configuration common to an electromagnetic suspension apparatus 11 according to the first to third embodiments of the present invention will be described with reference to FIGS. 1, 2. FIG. 1 is an overall configuration diagram common to the electromagnetic suspension apparatus 11 according to the first to third embodiments of the present invention. FIG. 2 is a partial cross-sectional view of an electromagnetic actuator 13 constituting a part of the electromagnetic suspension apparatus 11.

As shown in FIG. 1, the electromagnetic suspension apparatus 11 according to the first to third embodiments of the present invention includes a plurality of electromagnetic actuators 13 respectively provided for wheels of a vehicle 10, and an electronic control unit (hereinafter referred to as an "ECU") 15. The plurality of electromagnetic actuators 13 and the ECU 15 are connected to each other via a power supply line 14 (see a solid line in FIG. 1) for supplying drive control power from the ECU 15 to the plurality of electromagnetic actuators 13 and via a signal line 16 (see a dashed line in FIG. 1) for transmitting a rotation angle signal of an electric motor 31 (see FIG. 2) from each of the plurality of electromagnetic actuators 13 to the ECU 15. In the present embodiment, four electromagnetic actuators 13 are respectively provided for the wheels including front wheels (left front wheel/right front wheel) and rear wheels (left rear wheel/right rear wheel).

In the first to third embodiments of the present invention, each of the plurality of electromagnetic actuators 13 has a common configuration unless otherwise specified. Therefore, the plurality of electromagnetic actuators 13 will be described by describing a configuration of one electromagnetic actuator 13.

As shown in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports a base end of the ball screw shaft 23 rotatably axially via the ball bearing 21. The outer tube 19 is provided on the base housing 17 and accommodates a ball screw mechanism 18 including the ball screw shaft 23, the plurality of balls 25, and the nut 27. The plurality of balls 25 roll along a screw groove of the ball screw shaft 23. The nut 27 is engaged with the ball screw shaft 23 via the plurality of balls 25, and converts rotational motion of the ball screw shaft 23 into linear motion. The inner tube 29 connected to the nut 27 is integrated with the nut 27 and displaced in an axial direction of the outer tube 19.

As shown in FIG. 2, the electromagnetic actuator 13 includes the electric motor 31, a pair of pulleys 33, and a belt 35 in order to transmit a rotational driving force to the ball screw shaft 23. The electric motor 31 is provided on the base housing 17 so as to be arranged in parallel with the outer tube 19. The pulleys 33 are respectively attached to a motor shaft 31a of the electric motor 31 and the ball screw shaft 23. The belt 35 for transmitting the rotational driving force of the electric motor 31 to the ball screw shaft 23 is suspended on the pair of pulleys 33.

The electric motor 31 is provided with a resolver 37 for detecting the rotation angle signal of the electric motor 31. The rotation angle signal of the electric motor 31 detected by the resolver 37 is sent to the ECU 15 via the signal line 16. Rotational driving of the electric motor 31 is controlled in accordance with the drive control power supplied to each of the plurality of electromagnetic actuators 13 via the power supply line 14 by the ECU 15.

As shown in FIG. 2, in the present embodiment, a dimension in the axial direction of the electromagnetic actuator 13 is shortened by employing a layout in which the motor shaft 31a of the electric motor 31 and the ball screw shaft 23 are arranged substantially in parallel to be connected to each other. However, another layout may be employed in which the motor shaft 31a of the electric motor 31 and the ball screw shaft 23 are coaxially arranged to be connected to each other.

As shown in FIG. 2, in the electromagnetic actuator 13 according to the present embodiment, a connecting portion 39 is provided at a lower end of the base housing 17. The connecting portion 39 is connected and fixed to an unsprung member (not shown: a lower arm, a knuckle, etc. on the wheel side). On the other hand, the upper end 29a of the inner tube 29 is connected and fixed to a sprung member (not shown: a strut tower, etc. on a vehicle body side). In short, the electromagnetic actuator 13 is arranged in parallel with a spring member (not shown) provided between the vehicle body and the wheel of the vehicle 10.

The electromagnetic actuator 13 configured as described above operates as follows. That is, for example, it is assumed that a thrust related to an upward vibration is input to the connecting portion 39 from the wheel side of the vehicle 10. In this case, the inner tube 29 and the nut 27 try to integrally descend with respect to the outer tube 19 to which the thrust related to the upward vibration is applied. In response to this, the ball screw shaft 23 tries to rotate in a direction following the nut 27 descending. At this time, the rotational driving force of the electric motor 31 in a direction preventing the nut 27 from descending is generated. The rotational driving force of the electric motor 31 is transmitted to the ball screw shaft 23 via the belt 35. In this way, the vibration transmitted from the wheel side to the vehicle body side is attenuated by applying a reaction force (damping force) against the thrust related to the upward vibration to the ball screw shaft 23.

Internal Configuration of ECU 15

Figure 3:
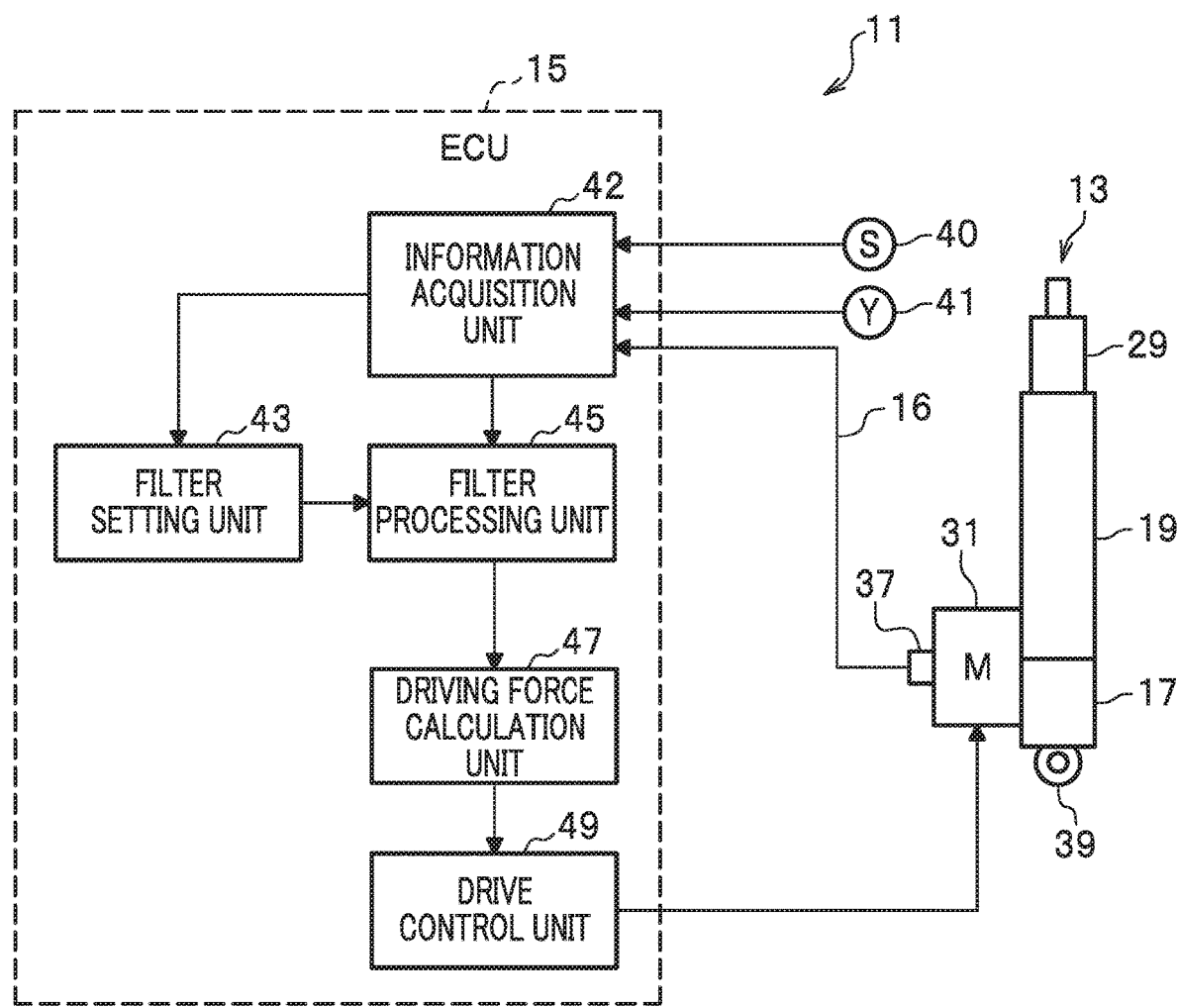
FIG. 3 is an internal configuration diagram of an ECU provided in the electromagnetic suspension apparatus.

Next, an internal configuration of the ECU 15 commonly provided in the electromagnetic suspension apparatus 11 according to the first to third embodiments of the present invention will be described with reference to FIG. 3. FIG. 3 is an internal configuration diagram of the ECU 15 commonly provided in the electromagnetic suspension apparatus 11 according to the first to third embodiments of the present invention.

The ECU 15 includes a microcomputer for performing various arithmetic processing. The ECU 15 drives and controls each of the plurality of electromagnetic actuators 13 based on the rotation angle signal or the like of the electric motor 31 detected by the resolver 37, so as to have a drive control function for generating the driving force related to vibration attenuation of the vehicle body. In order to realize such a drive control function, the ECU 15 includes an information acquisition unit 42, a filter setting unit 43, a filter processing unit 45, a driving force calculation unit 47, and a drive control unit 49 as shown in FIG. 3.

The information acquisition unit 42 acquires the rotation angle signal of the electric motor 31 detected by the resolver 37 as information on a stroke position and acquires information on a stroke speed by time-differentiating the stroke position. Further, as shown in FIG. 3, the information acquisition unit 42 acquires information on a vehicle speed V detected by a vehicle speed sensor 40 and a yaw rate Y detected by a yaw rate sensor 42. The information on the stroke speed, the vehicle speed V and the yaw rate Y corresponds to "information on a state quantity of the vehicle 10". The information on the stroke speed, the vehicle speed V and the yaw rate Y acquired by the information acquisition unit 42 is sent to the filter setting unit 43 and the filter processing unit 45.

The filter setting unit 43 selectively sets a filter having characteristics suitable for the vehicle speed V and the yaw rate Y at that time from among a plurality of filters (for example, see FIG. 4B; details will be described below) FS for which individual gain characteristics are respectively set, based on information on the vehicle speed V and the yaw rate Y acquired by the information acquisition unit 42 and a filter selection map (for example, see FIG. 4A; details will be described below). The information on the filter set by the filter setting unit 43 is sent to the filter processing unit 45.

The filter processing unit 45 performs a filtering process to apply the gain characteristic (high-pass characteristic) with respect to a frequency of the filter set by the filter setting unit 43 on a time series signal of the stroke speed acquired by the information acquisition unit 42, and thus outputs a stroke speed signal after the filtering process in which the gain is corrected to a frequency characteristic suitable for the vehicle speed V and the yaw rate Y at that time. The stroke speed signal after the filtering process by the filter processing unit 45 is sent to the driving force calculation unit 47. It should be noted that the filter processing unit 45 may be configured by an analog circuit or a digital circuit.

The driving force calculation unit 47 inputs the stroke speed signal after the filtering process and calculates a target drive control signal with reference to a damping force map 46 (see FIG. 4A) which is the relationship information between the stroke speed signal and the damping force according to a change in the stroke speed. The target drive control signal which is a calculation result of the driving force calculation unit 47 is sent to the drive control unit 49.

The drive control unit 49 supplies the drive control power to the electric motors 31 respectively provided in the plurality of electromagnetic actuators 13 according to the drive control signal sent from the driving force calculation unit 47, and thus independently controls driving of each of the plurality of electromagnetic actuators 13. For example, an inverter control circuit can be suitably used for generating the drive control power to be supplied to the electric motor 31.

Internal Configuration of ECU 15A Included in Electromagnetic Suspension Apparatus 11 According to First Embodiment Next, an internal configuration of the ECU 15A included in the electromagnetic suspension apparatus 11 according to a first embodiment will be described with reference to FIGS. 4A, 4B. FIG. 4A is an internal configuration diagram of the ECU 15A included in the electromagnetic suspension apparatus 11 according to the first embodiment. FIG. 4B is an explanatory diagram showing gain characteristics with respect to frequencies individually set for each of the plurality of filters FS selected based on the vehicle speed.

As shown in FIG. 4A, in the ECU 15A of the electromagnetic suspension apparatus 11 according to the first embodiment, the information acquisition unit 42 acquires the information on the stroke speed and the vehicle speed V, and transmits the acquired information on the vehicle speed V to a filter setting unit 43A, while sending the acquired information on the stroke speed to a filter processing unit 45A.

Figure 4B:
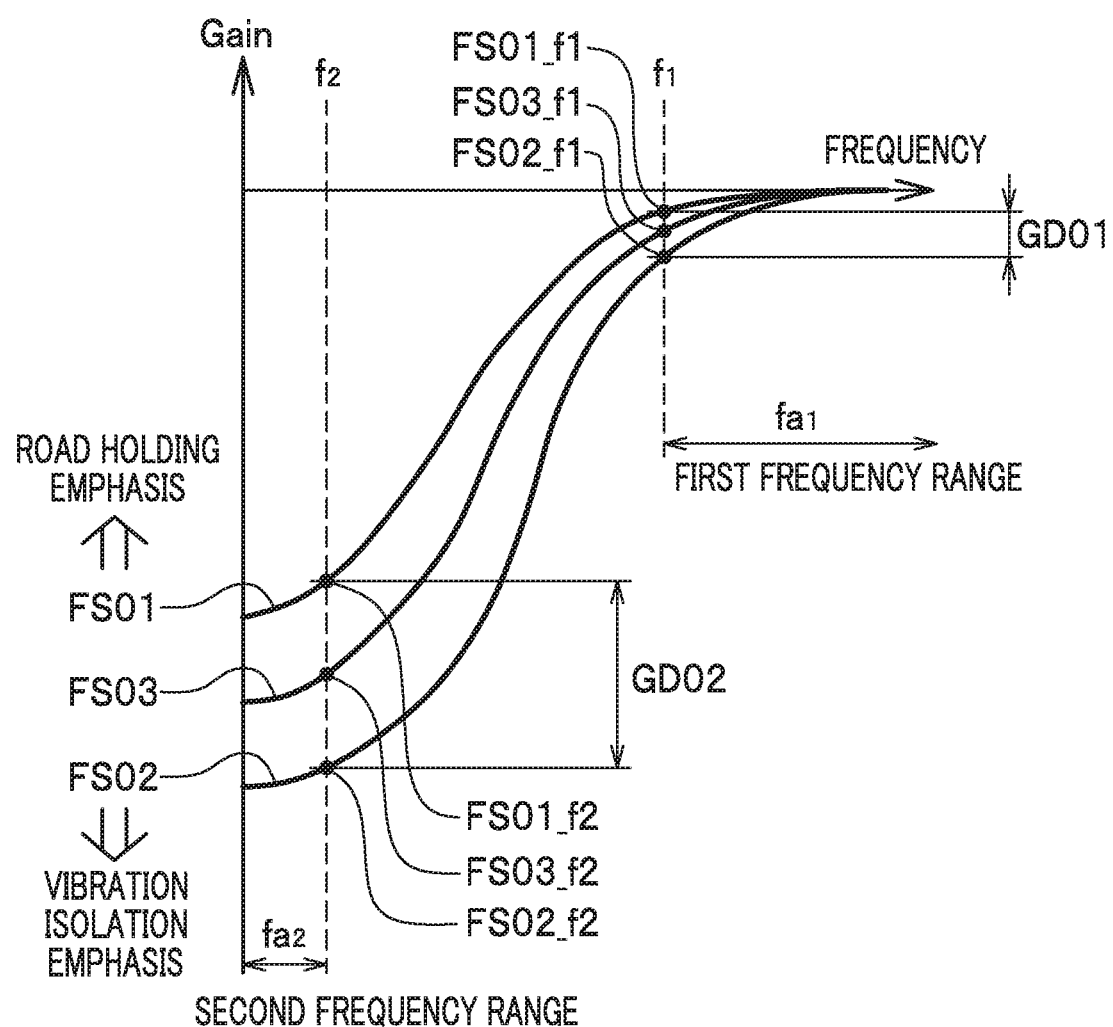
FIG. 4B is an explanatory diagram showing gain characteristics with respect to frequencies individually set for each of a plurality of filters selected based on a vehicle speed.

FIG. 4B illustrates a first filter FS01, a second filter FS02, and a third filter FS03 as an example of the plurality of filters FS registered in advance in the ECU 15A. When collectively referring to the plurality of filters such as the first filter FS01, the second filter FS02, and the third filter FS03, a code "FS" is attached to the plurality of filters (the same applies below).

As shown in FIG. 4B, the individual gain characteristics with respect to the frequency are respectively set in the first to third filters FS01, FS02, FS03 so that the gains FS01_f2, FS02_f2, FS03_f2 in the sprung resonance frequency f2 are lower than the gains FS01_f1, FS02_f1, FS03_f1 in the unsprung resonance frequency f1.

As shown in FIG. 4B, the gain characteristics of the first to third filters FS01, FS02, FS03 are set so that differences between the gains FS01_f2, FS02_f2, FS03_f2 in the sprung resonance frequency f2 and the gains FS01_f1, FS02_f1, FS03_f1 in the unsprung resonance frequency f1 are different from each other. Actually, the gain characteristics of the first to third filters FS01, FS02, FS03 are set so that {the difference between the gains in the frequency f1 and f2 of the first filter FS01 (FS01_f1-FS01_f2)}<{the difference between the gains in the frequency f1 and f2 of the second filter FS02 (FS02_f1-FS02_f2)}<{the difference between the gains in the frequency f1 and f2 of the third filter FS03 (FS03_f1-FS03_f2)}.

According to a viewpoint different from the above, as shown in FIG. 4B, the individual gain characteristics are respectively set in the first to third filters FS01, FS02, FS03 so that the gain is higher in a first frequency range fa1 exceeding the unsprung resonance frequency f1 than in the frequency range not higher than the unsprung resonance frequency f1, and the gain is lower in a second frequency range fa2, which is lower than the sprung resonance frequency f2 lower than the unsprung resonance frequency f1, than the frequency range not lower than the sprung resonance frequency f2.

The gain characteristic of the first filter FS01 is set to be higher than the gain characteristics of the second and third filters FS02, FS03 over the entire frequency range. In addition, the gain characteristic of the second filter FS02 is set to be lower than the gain characteristic of the third filter FS03 over the entire frequency range. In short, the first filter FS 01 has a road holding emphasis type gain characteristic. Because the first filter FS01 has a higher gain (damping force) than the second and third filters FS02, FS03 particularly in the second frequency range fa2 lower than the sprung resonance frequency f2, and is excellent in road holding performance of the unsprung (wheel). In addition, the second filter FS02 has a vibration isolation emphasis type gain characteristic. Because the second filter FS02 has a lower gain (damping force) than the first and third filters FS01, FS03 particularly in the second frequency range fa2 lower than the sprung resonance frequency f2, and is excellent in vibration isolation performance (ride comfort) to the sprung (vehicle body). The third filter FS03 has an intermediate gain characteristic between the first and second filters FS01, FS02.

As shown in FIG. 4B, a gain difference GD02 between the first filter FS01 and the second filter FS02 in the second frequency range fa2 is larger than a gain difference GD01 between the first filter FS01 and the second filter FS02 in the first frequency range fa1.

On the other hand, as shown in FIG. 4A, a filter selection map 44A based on the vehicle speed V is stored in the filter setting unit 43A as relationship information on filter characteristics suitable for a change in the vehicle speed V. A reason why the vehicle speed V is adopted as a parameter for filter selection is that the vehicle speed V is appropriate as one of indices for grasping a degree of request for increasing the road holding performance of the unsprung (wheel).

The filter selection map 44A based on the vehicle speed V is set such that the second filter FS02 having a vibration isolation emphasis type gain characteristic is selected when the vehicle speed V is in a second filter selection range less than a first vehicle speed threshold V1 (V<V1), the third filter FS03 having an intermediate gain characteristic is selected when the vehicle speed V is in a third filter selection range not lower than the first vehicle speed threshold V1 and not higher than a second vehicle speed threshold V2 (V1≤V≤V2), and the first filter FS01 having a road holding emphasis type gain characteristic is selected when the vehicle speed V is in a first filter selection range exceeding the second vehicle speed threshold V2. As the first and second vehicle speed thresholds V1, V2, appropriate values can be set through experiments, simulations, or the like considering a balance of the road holding performance/vibration isolation performance in which the degree of request varies according to the level of the vehicle speed V.

Figure 5A:
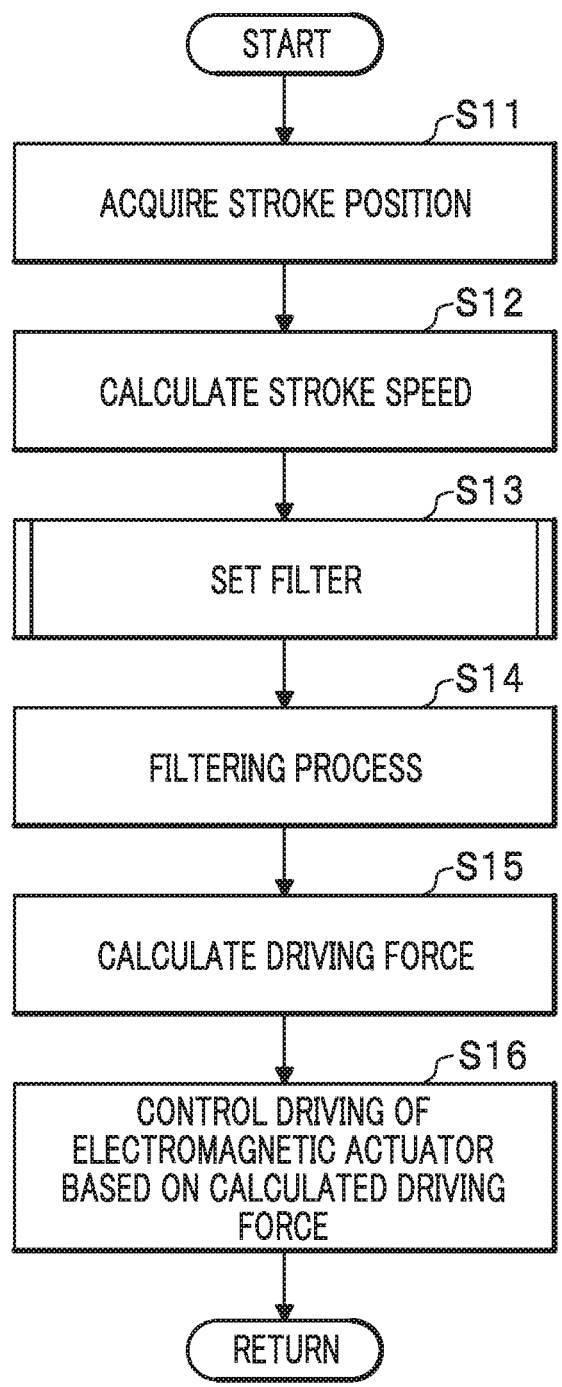
FIG. 5A is a flowchart for explaining an operation of the electromagnetic suspension apparatus according to the embodiment of the present invention.

Operation of Electromagnetic Suspension Apparatus 11 According to First Embodiment Next, an operation of the electromagnetic suspension apparatus 11 according to the first embodiment of the present invention will be described with reference to FIGS. 5A, 5B. FIGS. 5A, 5B are flowcharts for explaining the operation of the electromagnetic suspension apparatus according to the embodiment of the present invention.

In Step S11 (stroke position acquisition) shown in FIG. 5A, the information acquisition unit 42 of the ECU 15A acquires the rotation angle signal of the electric motor 31 detected by the resolver 37 as information on the stroke position. Further, the information acquisition unit 42 acquires information on the vehicle speed V detected by the vehicle speed sensor 40. The information on the vehicle speed V acquired by the information acquisition unit 42 is sent to the filter setting unit 43A.

In Step S12 (stroke speed calculation), the information acquisition unit 42 of the ECU 15A calculates the stroke speed by time-differentiating the information on the stroke position acquired in Step S11. The information on the stroke speed calculated in this way is sent to the filter processing unit 45A.

In Step S13 (filter setting), the filter setting unit 43A of the ECU 15A selectively set a filter with characteristics suitable for the vehicle speed V at that time based on the information of the vehicle speed V acquired in Step S11 and the filter selection map 44A (see FIG. 4A) based on the vehicle speed V. The filter information set by the filter setting unit 43A is sent to the filter processing unit 45A.

Here, the filter setting process (Step S13) performed by the filter setting unit 43A of the ECU 15A will be described with reference to FIG. 5B. In Step S21 shown in FIG. 5B, the filter setting unit 43A of the ECU 15A acquires the information on the vehicle speed V acquired in Step S11 as information on the state quantity of the vehicle 10.

In Step S22, the filter setting unit 43A of the ECU 15A selects a filter having a characteristic suitable for the vehicle speed V, which is the state quantity of the vehicle 10, from among the plurality of filters FS having individual gain characteristics respectively set thereto.

In Step S23, the filter setting unit 43A of the ECU 15A compares information on the currently set filter type and the filter type selected in Step S22 side by side, and determines based on the comparison result whether setting of the filter selected in Step S22 is a change from a vibration isolation emphasis type to a road holding emphasis type. As a result of this determination, when it is determined that the change from the vibration isolation emphasis type to the road holding emphasis type is made, the filter setting unit 43A of the ECU 15A allows a process flow to proceed to next Step S24. On the other hand, when it is determined that the change from the vibration isolation emphasis type to the road holding emphasis type is not made, the filter setting unit 43A of the ECU 15A allows the process flow to jump to Step S25. When the type of filter currently set and the type of filter selected in Step S22 are the same, it satisfies a condition that "the change from the vibration isolation emphasis type to the road holding emphasis type is not made".

In Step S24, when it is determined that the change from the vibration isolation emphasis type to the road holding emphasis type is made, the filter setting unit 43A of the ECU 15A performs a quick setting to quickly set the filter selected in Step S 22 without delay. Thereafter, the ECU 15A terminates the filter setting process, and advances the process flow to next Step S14.

Figure 5C:
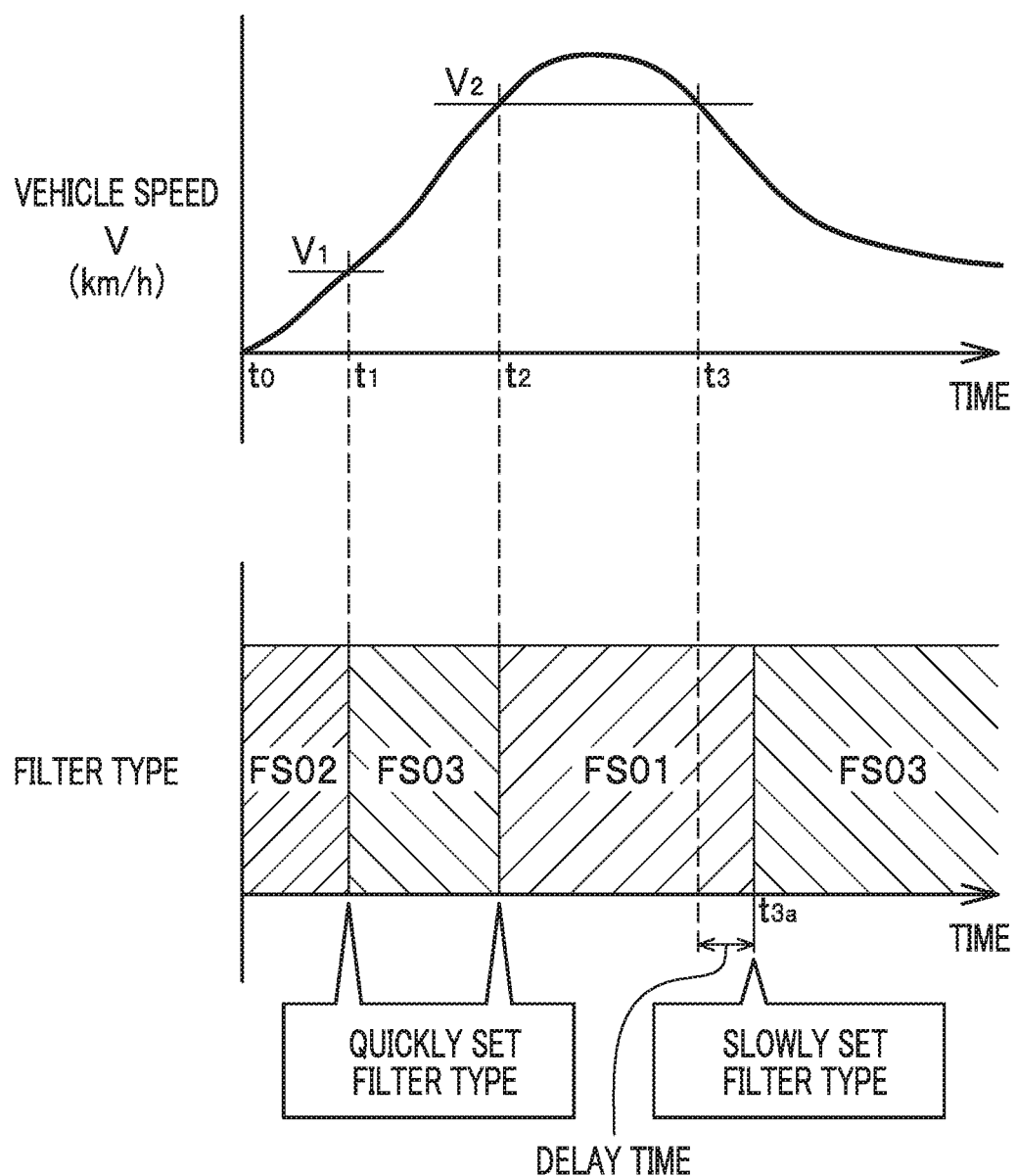
FIG. 5C is a time chart showing an example of setting a filter type based on a time series change in the vehicle speed in association with the time series change in the vehicle speed.

On the other hand, in Step S25, when it is determined that the change from the vibration isolation emphasis type to the road holding emphasis type is not made, the filter setting unit 43A of the ECU 15A performs a slow setting to slowly set the filter selected in Step S22 with a predetermined delay time (t3a-t3: see FIG. 5C). Thereafter, the ECU 15A terminates the filter setting process of Step S13 and advances the process flow to next Step S14.

Here, a specific example of the filter setting process based on the change in the vehicle speed V will be described with reference to FIG. 5C. FIG. 5C is a time chart showing an example of setting the filter type based on a time series change of the vehicle speed V in association with the time series change of the vehicle speed V.

As shown in FIG. 5C, the vehicle speed V increases substantially linearly in a section from a time t0 to immediately before a time t1. In this section, since the vehicle speed V is less than the first vehicle speed threshold V1, the second filter FS02 having the vibration isolation emphasis type gain characteristic is set.

At the time t1, the vehicle speed V reaches the first vehicle speed threshold V1. At the same time t1, the filter setting unit 43A of the ECU 15A selects the third filter FS03 having the intermediate gain characteristic as a filter based on the vehicle speed V1. A change of the filter type from the second filter FS02 to the third filter FS03 corresponds to the change from the vibration isolation emphasis type to the road holding emphasis type. This is because a degree of request for improving steering stability by emphasizing the grounding is increased when the vehicle speed V exceeds the first vehicle speed threshold V1 in the first embodiment. Therefore, at the same time t1, the selected third filter FS03 is quickly set as the filter type by the filter setting unit 43A of the ECU 15A.

As shown in FIG. 5C, in a section from the time t1 to immediately before a time t2, the vehicle speed V continues to increase substantially linearly. In this section, the third filter FS03 having the vibration isolation emphasis type gain characteristic is set.

At the time t2, the vehicle speed V reaches the second vehicle speed threshold V2. At the same time t2, the filter setting unit 43 of the ECU 15 selects the first filter FS01 having the road holding emphasis type gain characteristic as a filter based on the vehicle speed V2. The change of the filter type from the third filter FS03 to the first filter FS01 corresponds to the change from the vibration isolation emphasis type to the road holding emphasis type. This is because the degree of request for improving steering stability by emphasizing the grounding is increased when the vehicle speed V exceeds the second vehicle speed threshold V2 in the first embodiment. Therefore, at the same time t2, the first filter FS01 selected as the filter type is quickly set by the filter setting unit 43A of the ECU 15A.

As shown in FIG. 5C, in a section from the time t2 to immediately before a time t3, the vehicle speed V changes from an increasing trend to a decreasing trend. In this section, since the vehicle speed V exceeds the second vehicle speed threshold V2, the first filter FS01 having the road holding emphasis type gain characteristic is set.

At the time t3, the vehicle speed V is lower than the second vehicle speed threshold V2. At the same time t3, the filter setting unit 43 of the ECU 15 selects the third filter FS03 having the intermediate gain characteristic between the first and second filters FS01, FS02 as a filter based on the vehicle speed (V1<V<V2). The change of the filter type from the first filter FS01 to the third filter FS03 corresponds to a change from the road holding emphasis type to the vibration isolation emphasis type. This is because the degree of request for improving steering stability by emphasizing the grounding is reduced when the vehicle speed V is lower than the second vehicle speed threshold V2 (V1<V<V2) in the first embodiment. Therefore, at a time t3a obtained by adding the predetermined delay time to the same time t3, the third filter FS03 selected as the filter type is slowly set by the filter setting unit 43A of the ECU 15A. As the predetermined delay time, an appropriate value can be set through experiments, simulations, or the like considering a change (quick change is not required) of the filter type from the road holding emphasis type to the vibration isolation emphasis type.

Upon completion of the filter setting process, in Step S14 (filtering process), the filter processing unit 45A of the ECU 15A performs the filtering process for applying the gain characteristic (high-pass characteristic) for the frequency of the filter set in Step S24 or S25 on the time series signal of the stroke speed calculated (acquired) in Step S12, so as to output the stroke speed signal after the filtering process in which the gain is corrected to the frequency characteristic suitable for the vehicle speed V at that time. The stroke speed signal after the filtering process by the filter processing unit 45A is sent to the driving force calculation unit 47.

In Step S15 (driving force calculation process), the driving force calculation unit 47 of the ECU 15A inputs the stroke speed signal after the filtering process in Step S14, and calculates the drive control signal including a target drive control current value with reference to the stroke speed signal and the damping force map 46.

In Step S16, the drive control unit 49 of the ECU 15A supplies the drive control power to the electric motor 31 provided in each of the plurality of electromagnetic actuators 13 in accordance with the drive control signal calculated in Step S15, to control driving of the plurality of electromagnetic actuators 13.

Operational Effect of Electromagnetic Suspension Apparatus 11 According to First Embodiment According to the electromagnetic suspension apparatus 11 of the first embodiment, it is possible to finely set the filter according to the level of the vehicle speed V as the state quantity of the vehicle so as to obtain the effect that the road holding performance (steering stability) is secured by maintaining a relatively high gain as the gain characteristic of the filter in the first frequency range fa1 exceeding the unsprung resonance frequency f1 (about 10 to 13 Hz), while the vibration isolation performance (ride comfort) is obtained by making the gain characteristic of the filter adjustable over a wide range in the second frequency range fa2 lower than the sprung resonance frequency f2 (about 0.8 to 2 Hz). Specifically, for example, in the high vehicle speed range where the road holding performance is important, the road holding emphasis type filter is selected, which has a gain characteristic with a smaller reduction amount of the filter gain in the second frequency range fa2 lower than the sprung resonance frequency f2 as compared with the filter gain in the first frequency range fa1 exceeding the unsprung resonance frequency f1. Thus, good road holding performance can be obtained. On the other hand, in the low to middle vehicle speed range where the vibration isolation performance is important, the vibration isolation emphasis type filter is selected, which has a gain characteristic with a larger reduction amount of the filter gain in the second frequency range fa2 lower than the sprung resonance frequency f2 as compared with the filter gain in the first frequency range fa1 exceeding the unsprung resonance frequency f1. Thus, good vibration isolation performance can be obtained. As a result, it is possible to obtain both the vibration isolation performance of the sprung member (such as the vehicle body) and the road holding performance of the unsprung member (such as the wheel) at a high level according to the motion state of the vehicle 10 (level of the vehicle speed V) which fluctuates every moment.

Figure 6A:
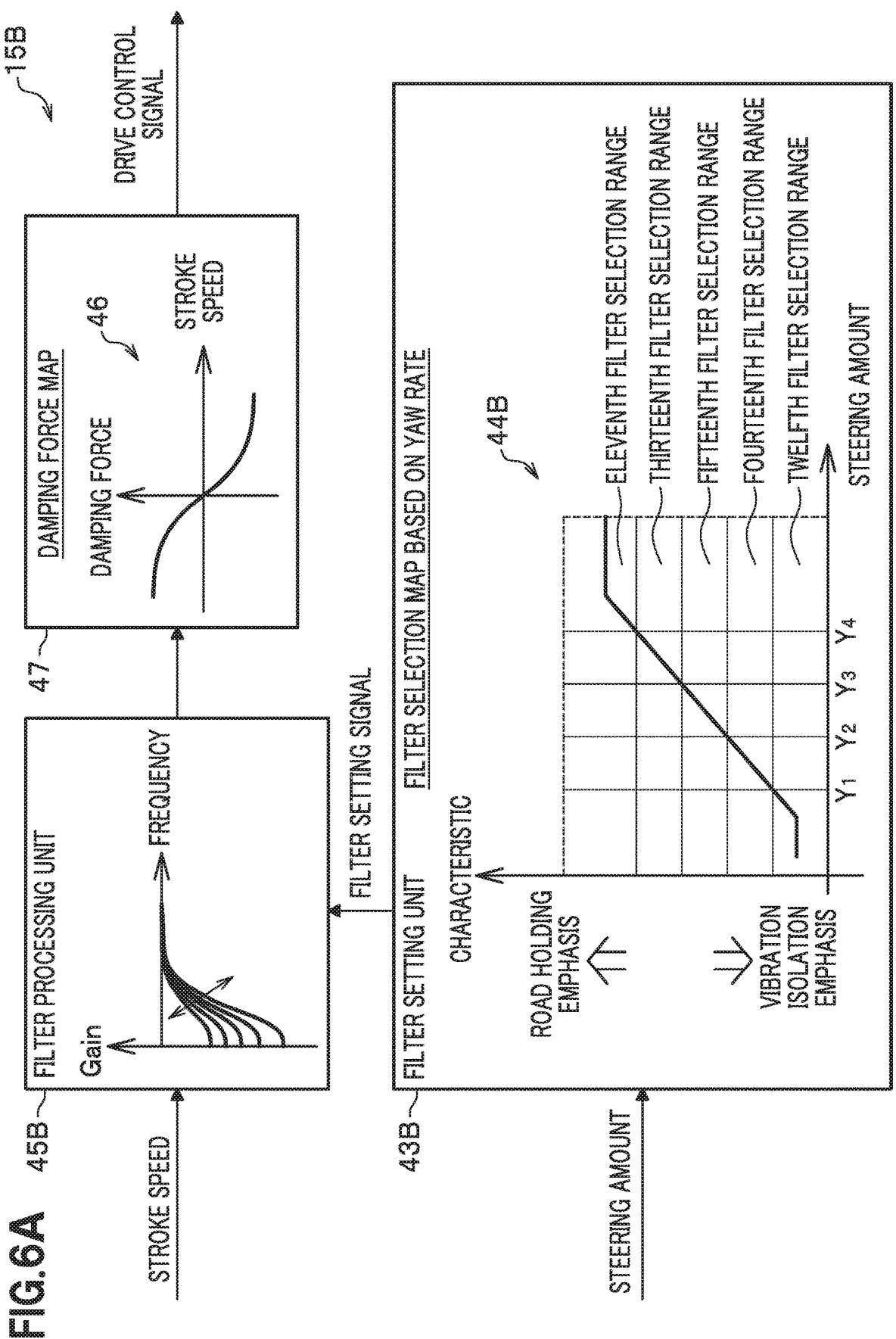
FIG. 6A is an internal configuration diagram of an ECU included in the electromagnetic suspension apparatus according to a second embodiment.
Figure 6B:
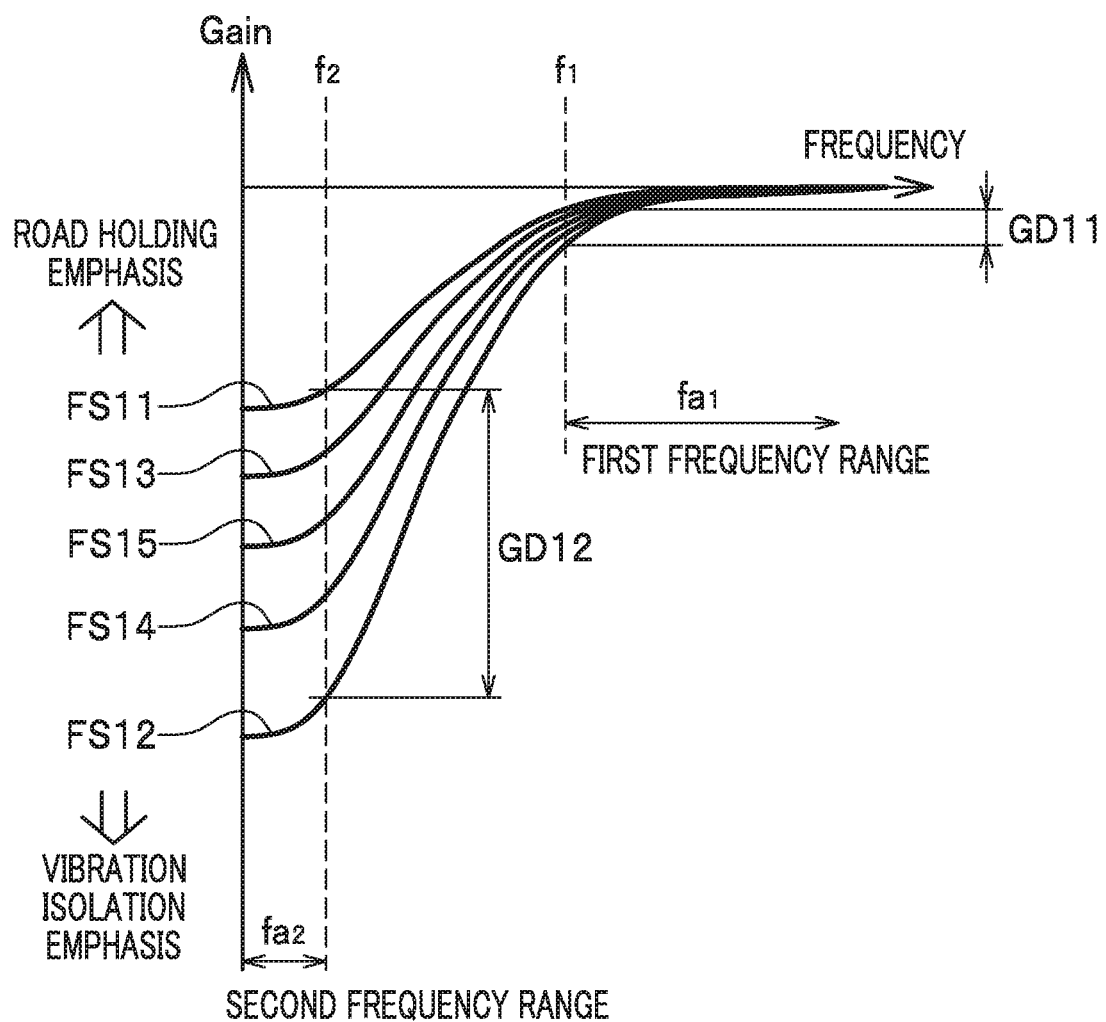
FIG. 6B is an explanatory diagram showing gain characteristics with respect to frequencies individually set for each of a plurality of filters selected based on a yaw rate.

Internal Configuration of ECU 15B Included in Electromagnetic Suspension Apparatus 11 According to Second Embodiment Next, an internal configuration of the ECU 15B included in the electromagnetic suspension apparatus 11 according to a second embodiment will be described with reference to FIGS. 6A, 6B. FIG. 6A is an internal configuration diagram of the ECU 15B included in the electromagnetic suspension apparatus 11 according to the second embodiment. FIG. 6B is an explanatory diagram showing gain characteristics with respect to frequencies individually set for each of the plurality of filters FS selected based on the yaw rate (steering amount) Y. Here, the ECU 15A according to the first embodiment and the ECU 15B according to the second embodiment have many constituent elements common to both. Therefore, the ECU 15B according to the second embodiment will be described by focusing on different components between them.

In the filter setting unit 43A of the ECU 15A according to the first embodiment, the filter selection map 44A (see FIG. 4A) based on the vehicle speed V is stored as the relationship information on the filter characteristics suitable for the change in the vehicle speed V. On the other hand, in the filter setting unit 43B of the ECU 15B according to the second embodiment, the filter selection map 44B (see FIG. 6A) based on the yaw rate Y is stored as the relationship information on the filter characteristics suitable for the change of the yaw rate Y (instead of the vehicle speed V).

Further, in the filter setting unit 43A of the ECU 15A according to the first embodiment, FIG. 4B shows as an example three filters including the first filter FS01, the second filter FS02 and the third filter FS03 as the plurality of filters FS registered in advance in the ECU 15A. On the other hand, in the filter setting unit 43B of the ECU 15B according to the second embodiment, FIG. 6B shows as an example five filters including the eleventh filter FS11, the twelfth filter FS12, the thirteenth filter FS13, a fourteenth filter FS14, and a fifteenth filter FS15 as the plurality of filters FS registered in advance in the ECU 15B.

That is, as shown in FIG. 6B, the individual gain characteristics are respectively set in the eleventh to fifteenth filters FS11, FS12, FS13, FS14, FS15 so that the gain is higher in the first frequency range fa1 exceeding the unsprung resonance frequency f1 than in the frequency range not higher than the unsprung resonance frequency f1, and the gain is lower in the second frequency range fa2, which is lower than the sprung resonance frequency f2 lower than the unsprung resonance frequency f1, than the frequency range not lower than the sprung resonance frequency f2.

The gain characteristic of the eleventh filter FS11 is set to be higher than the gain characteristics of the twelfth to fifteenth filters FS12, FS13, FS14, and FS15 over the entire frequency range. Similarly, the gain characteristic of the thirteenth filter FS13 is set to be higher than the gain characteristics of the twelfth filter FS12, the fourteenth to fifteenth filters FS14, FS15 over the entire frequency range. In short, the eleventh filter FS11 and the thirteenth filter FS13 have the road holding emphasis type gain characteristics. Because the eleventh filter FS11 and the thirteenth filter FS13 have higher gains (damping forces) than the intermediate type fifteenth filter FS15 particularly in the second frequency range fa2 lower than the sprung resonance frequency f2, and are excellent in road holding performance (steering stability) of the vehicle wheel.

On the other hand, the twelfth filter FS12 and the fourteenth filter FS14 have the vibration isolation emphasis type gain characteristics. Because the twelfth filter FS12 and the fourteenth filter FS14 have lower gains (damping forces) than the intermediate type fifteenth filter FS15 particularly in the second frequency range fa2 lower than the sprung resonance frequency f2, and are excellent in vibration isolation performance (ride comfort) to the vehicle body.

As shown in FIG. 6B, a gain difference GD12 between the eleventh filter FS11 and the twelfth filter FS12 in the second frequency range fa2 is larger than a gain difference GD11 between the eleventh filter FS11 and the twelfth filter FS12 in the first frequency range fa1.

On the other hand, as shown in FIG. 6A, a filter selection map 44B based on the yaw rate Y is stored in the filter setting unit 43B as relationship information on filter characteristics suitable for a change in the yaw rate Y. A reason why the yaw rate Y is adopted as a parameter for filter selection is that the yaw rate Y is appropriate as one of indices for grasping a degree of the request for increasing the road holding performance of the unsprung (wheel).

The filter selection map 44B based on the yaw rate Y is set such that the twelfth filter FS12 having a vibration isolation emphasis type gain characteristic is selected when the yaw rate Y is in a twelfth filter selection range not higher than a first steering amount threshold Y1 (Y≤Y1), the fourteenth filter FS14 having a vibration isolation emphasis type gain characteristic is selected when the yaw rate Y is in a fourteenth filter selection range exceeding the first steering amount threshold Y1 and not higher than a second steering amount threshold Y2 (Y1<Y≤Y2), the fifteenth filter FS15 having an intermediate gain characteristic is selected when the yaw rate Y is in a fifteenth filter selection range exceeding the second steering amount threshold Y2 and not higher than a third steering amount threshold Y3 (Y2<Y≤Y3), the twelfth filter FS12 having a road holding emphasis type gain characteristic is selected when the yaw rate Y is in a twelfth filter selection range exceeding the third steering amount threshold Y3 and not higher than a fourth steering amount threshold Y4 (Y3<Y≤Y4), and the eleventh filter FS11 having a road holding emphasis type gain characteristic is selected when the yaw rate Y is in an eleventh filter selection range exceeding the fourth steering amount threshold Y4 (Y4<Y). As the first to fourth steering amount thresholds Y1, Y2, Y3, Y4, appropriate values can be set through experiments, simulations, or the like considering the balance of the road holding performance/vibration isolation performance in which the degree of request varies according to the level of the yaw rate Y.

Operation of Electromagnetic Suspension Apparatus 11 According to Second Embodiment Next, an operation of the electromagnetic suspension device 11 according to the second embodiment of the present invention will be described with reference to FIGS. 5A, 5B.

In Step S11 (stroke position acquisition) shown in FIG. 5A, the information acquisition unit 42 of the ECU 15B acquires the rotation angle signal of the electric motor 31 detected by the resolver 37 as information on the stroke position. Further, the information acquisition unit 42 acquires the information on the yaw rate Y detected by the yaw rate sensor 42. The information on the yaw rate Y acquired by the information acquisition unit 42 is sent to the filter setting unit 43B.

In Step S12 (stroke speed calculation), the information acquisition unit 42 of the ECU 15B calculates the stroke speed by time-differentiating the information on the stroke position acquired in Step S11. The information on the stroke speed calculated in this way is sent to the filter processing unit 45B.

In Step S13 (filter setting), the filter setting unit 43B of the ECU 15B selectively sets a filter having characteristics suitable for the yaw rate Y at that time based on the information of the yaw rate Y acquired in Step S11 and the filter selection map 44B (see FIG. 6A) based on the yaw rate Y. The filter information set by the filter setting unit 43B is sent to the filter processing unit 45B.

Here, the filter setting process (Step S13) performed by the filter setting unit 43B of the ECU 15B will be described with reference to FIG. 5B. In Step S21 shown in FIG. 5B, the filter setting unit 43B of the ECU 15B acquires the information on the yaw rate Y acquired in Step S11 as information on the state quantity of the vehicle 10.

In Step S22, the filter setting unit 43B of the ECU 15B selects a filter having a characteristic suitable for the yaw rate Y, which is the state quantity of the vehicle 10, from among the plurality of filters FS having individual gain characteristics respectively set thereto.

In Step S23, the filter setting unit 43B of the ECU 15B compares information on the currently set filter type and the filter type selected in Step S22 side by side, and determines based on the comparison result whether setting of the filter selected in Step S22 is the change from the vibration isolation emphasis type to the road holding emphasis type. As a result of this determination, when it is determined that the change from the vibration isolation emphasis type to the road holding emphasis type is made, the filter setting unit 43B of the ECU 15B allows the process flow to proceed to next Step S24. On the other hand, when it is determined that the change from the vibration isolation emphasis type to the road holding emphasis type is not made, the filter setting unit 43B of the ECU 15B allows the process flow to jump to Step S25. When the type of filter currently set and the type of filter selected in Step S22 are the same, it satisfies the condition that "the change from the vibration isolation emphasis type to the road holding emphasis type is not made".

In Step S24, when it is determined that the change from the vibration isolation emphasis type to the road holding emphasis type is made, the filter setting unit 43B of the ECU 15B performs a quick setting to quickly set the filter selected in Step S 22 without delay. Thereafter, the ECU 15B terminates the filter setting process, and advances the process flow to next Step S14.

Figure 6C:
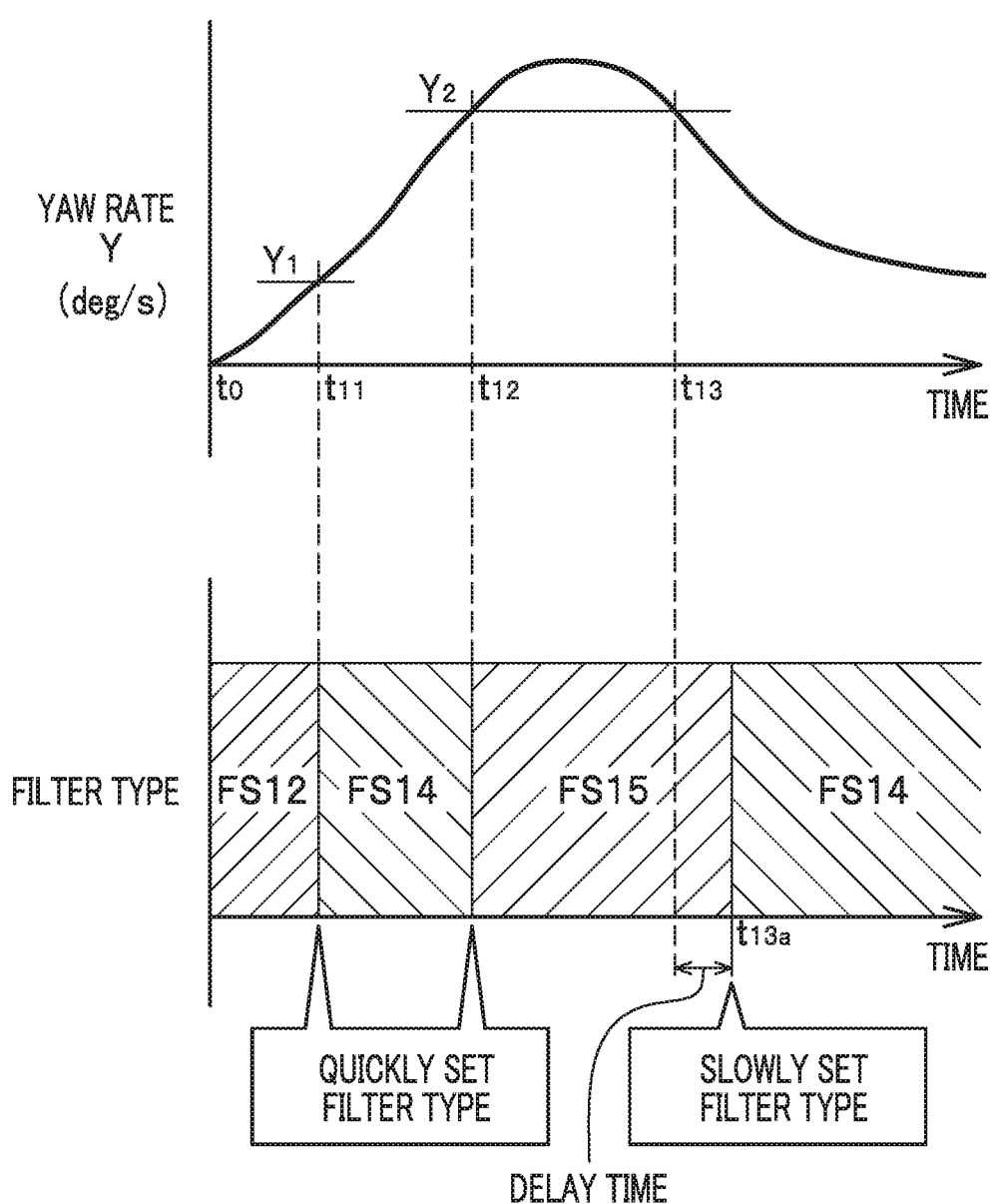
FIG. 6C is a time chart showing an example of setting the filter type based on a time series change in the yaw rate in association with the time series change in the yaw rate.

On the other hand, in Step S25, when it is determined that the change from the vibration isolation emphasis type to the road holding emphasis type is not made, the filter setting unit 43B of the ECU 15B performs the slow setting to slowly set the filter selected in Step S22 with a predetermined delay time (t13a-t13: see FIG. 6C). Thereafter, the ECU 15B terminates the filter setting process of Step S13 and advances the process flow to next Step S14.

Here, a specific example of the filter setting process based on the change in the yaw rate Y will be described with reference to FIG. 6C. FIG. 6C is a time chart showing an example of setting the filter type based on a time series change of the yaw rate Y in association with the time series change of the yaw rate Y.

As shown in FIG. 6C, the yaw rate Y increases substantially linearly in a section from a time t0 to a time t11. In this section, since the yaw rate Y is less than the first steering amount threshold Y1, the twelfth filter FS12 having the vibration isolation emphasis type gain characteristic is set.

At the time t11, the yaw rate Y reaches the first steering amount threshold Y1. At the same time t11, the filter setting unit 43B of the ECU 15B selects the fourteenth filter FS14 having the vibration isolation emphasis type gain characteristic as a filter based on the yaw rate Y1. A change of the filter type from the twelfth filter FS12 to the fourteenth filter FS14 corresponds to the change from the vibration isolation emphasis type to the road holding emphasis type. This is because the degree of request for improving steering stability by emphasizing the grounding is increased when the yaw rate Y exceeds the first steering amount threshold Y1 in the second embodiment. Therefore, at the same time t11, the selected fourteenth filter FS14 is quickly set as the filter type by the filter setting unit 43B of the ECU 15B.

As shown in FIG. 6C, in a section from the time t11 to a time t12, the yaw rate Y continues to increase substantially linearly. In this section, the fourteenth filter FS14 having the vibration isolation emphasis type gain characteristic is set.

At the time t12, the yaw rate Y reaches the second steering amount threshold Y2. At the same time t12, the filter setting unit 43B of the ECU 15B selects the fifteenth filter FS15 having the intermediate gain characteristic as a filter based on the yaw rate Y2. The change of the filter type from the fourteenth filter FS14 to the fifteenth filter FS15 corresponds to the change from the vibration isolation emphasis type to the road holding emphasis type. This is because the degree of request for improving steering stability by emphasizing the grounding is increased when the yaw rate Y exceeds the second steering amount threshold Y2 in the second embodiment. Therefore, at the same time t12, the fifteenth filter FS15 selected as the filter type is quickly set by the filter setting unit 43B of the ECU 15B.

As shown in FIG. 6C, in a section from the time t12 to a time t13, the yaw rate Y changes from an increasing trend to a decreasing trend. In this section, since the yaw rate Y exceeds the second steering amount threshold Y2, the fifteenth filter FS15 having the intermediate gain characteristic is set.

At the time t13, the yaw rate Y is lower than the second steering amount threshold Y2. At the same time t3, the filter setting unit 43B of the ECU 15B selects the fourteenth filter FS14 having the vibration isolation emphasis type gain characteristic as a filter based on the yaw rate (Y1<Y<Y2). The change of the filter type from the fifteenth filter FS15 to the fourteenth filter FS14 corresponds to a change from the road holding emphasis type to the vibration isolation emphasis type. This is because the degree of request for improving steering stability by emphasizing the grounding is reduced when the yaw rate Y is lower than the second steering amount threshold Y2 (Y1<Y<Y2) in the second embodiment. Therefore, at a time t13a obtained by adding the predetermined delay time to the same time t13, the fourteenth filter FS14 selected as the filter type is slowly set by the filter setting unit 43B of the ECU 15B. As the predetermined delay time, an appropriate value can be set through experiments, simulations, or the like considering a change (quick change is not required) of the filter type from the road holding emphasis type to the vibration isolation emphasis type.

Upon completion of the filter setting process, in Step S14 (filtering process), the filter processing unit 45B of the ECU 15B performs the filtering process for applying the gain characteristic (high-pass characteristic) for the frequency of the filter set in Step S24 or S25 on the time series signal of the stroke speed calculated (acquired) in Step S12, so as to output the stroke speed signal after the filtering process in which the gain is corrected to the frequency characteristic suitable for the yaw rate Y at that time. The stroke speed signal after the filtering process by the filter processing unit 45B is sent to the driving force calculation unit 47.

In Step S15 (driving force calculation process), the driving force calculation unit 47 of the ECU 15B inputs the stroke speed signal after the filtering process in Step S14, and calculates the drive control signal including a target drive control current value with reference to the stroke speed signal and the damping force map 46.

In Step S16, the drive control unit 49 of the ECU 15B supplies the drive control power to the electric motor 31 provided in each of the plurality of electromagnetic actuators 13 in accordance with the drive control signal calculated in Step S15, to control driving of the plurality of electromagnetic actuators 13.

Operational Effect of Electromagnetic Suspension Apparatus 11 According to Second Embodiment According to the electromagnetic suspension apparatus 11 of the second embodiment, it is possible to finely set the filter according to the level of the yaw rate Y as the state quantity of the vehicle so as to obtain the effect that the road holding performance (steering stability) is secured by maintaining a relatively high gain as the gain characteristic of the filter in the first frequency range fa1 exceeding the unsprung resonance frequency f1 (about 10 to 13 Hz), while the vibration isolation performance (ride comfort) is obtained by making the gain characteristic of the filter adjustable over a wide range in the second frequency range fa2 lower than the sprung resonance frequency f2 (about 0.8 to 2 Hz). Specifically, for example, during turning (steering amount is large) when the road holding performance is important, the road holding emphasis type filter is selected, which has a gain characteristic with a smaller reduction amount of the filter gain in the second frequency range fa2 lower than the sprung resonance frequency f2 as compared with the filter gain in the first frequency range fa1 exceeding the unsprung resonance frequency f1. Thus, good road holding performance can be obtained. On the other hand, during steady running including linear running (steering amount is small) when the vibration isolation performance is important, the vibration isolation emphasis type filter is selected, which has a gain characteristic with a larger reduction amount of the filter gain in the second frequency range fa2 lower than the sprung resonance frequency f2 as compared with the filter gain in the first frequency range fa1 exceeding the unsprung resonance frequency f1. Thus, good vibration isolation performance can be obtained. As a result, it is possible to obtain both the vibration isolation performance of the sprung member (such as the vehicle body) and the road holding performance of the unsprung member (such as the wheel) at a high level according to the motion state of the vehicle 10 (level of the yaw rate Y) which fluctuates every moment.

Figure 7A:
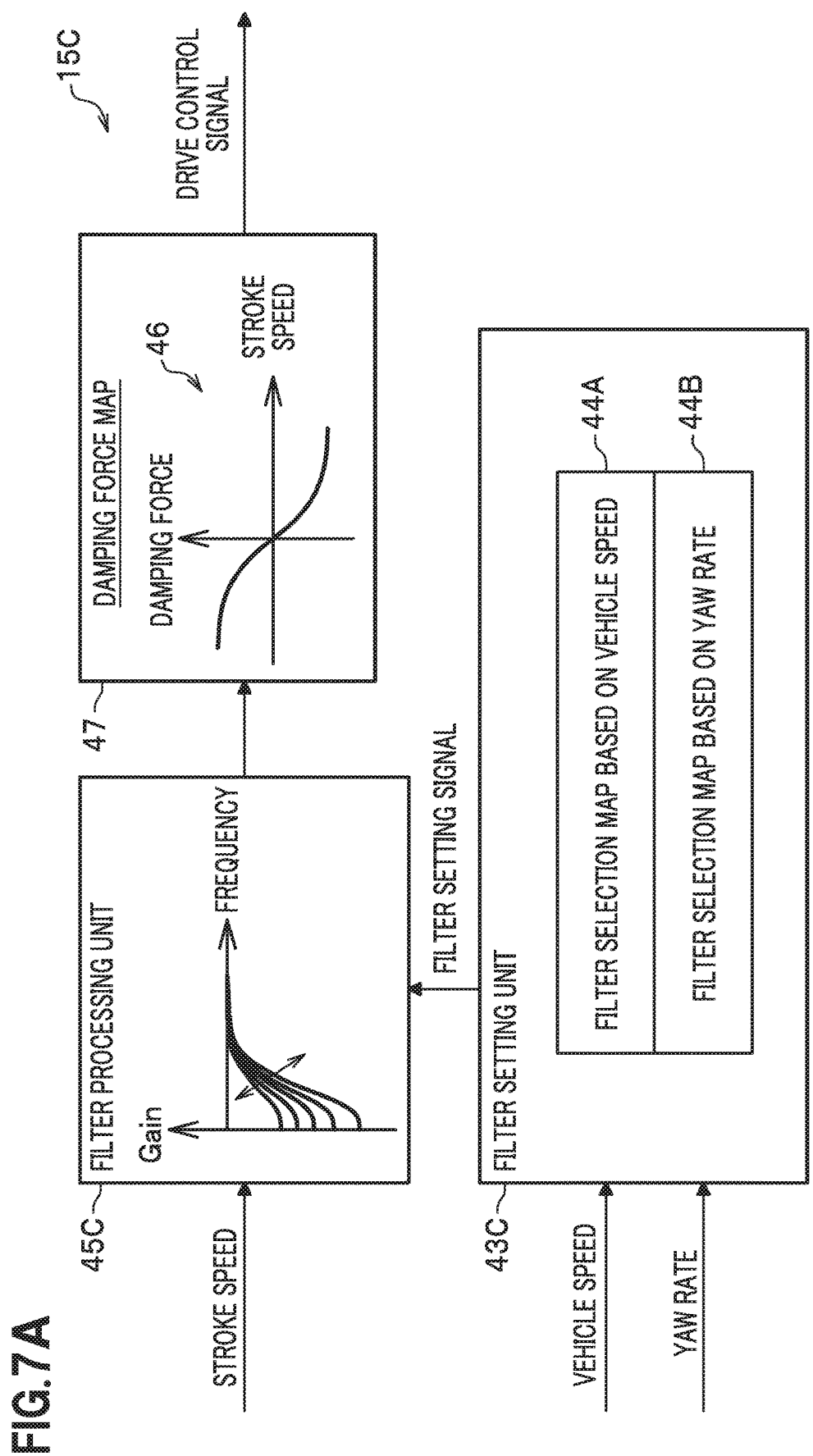
FIG. 7A is an internal configuration diagram of an ECU included in the electromagnetic suspension apparatus according to a third embodiment.
Figure 7B:
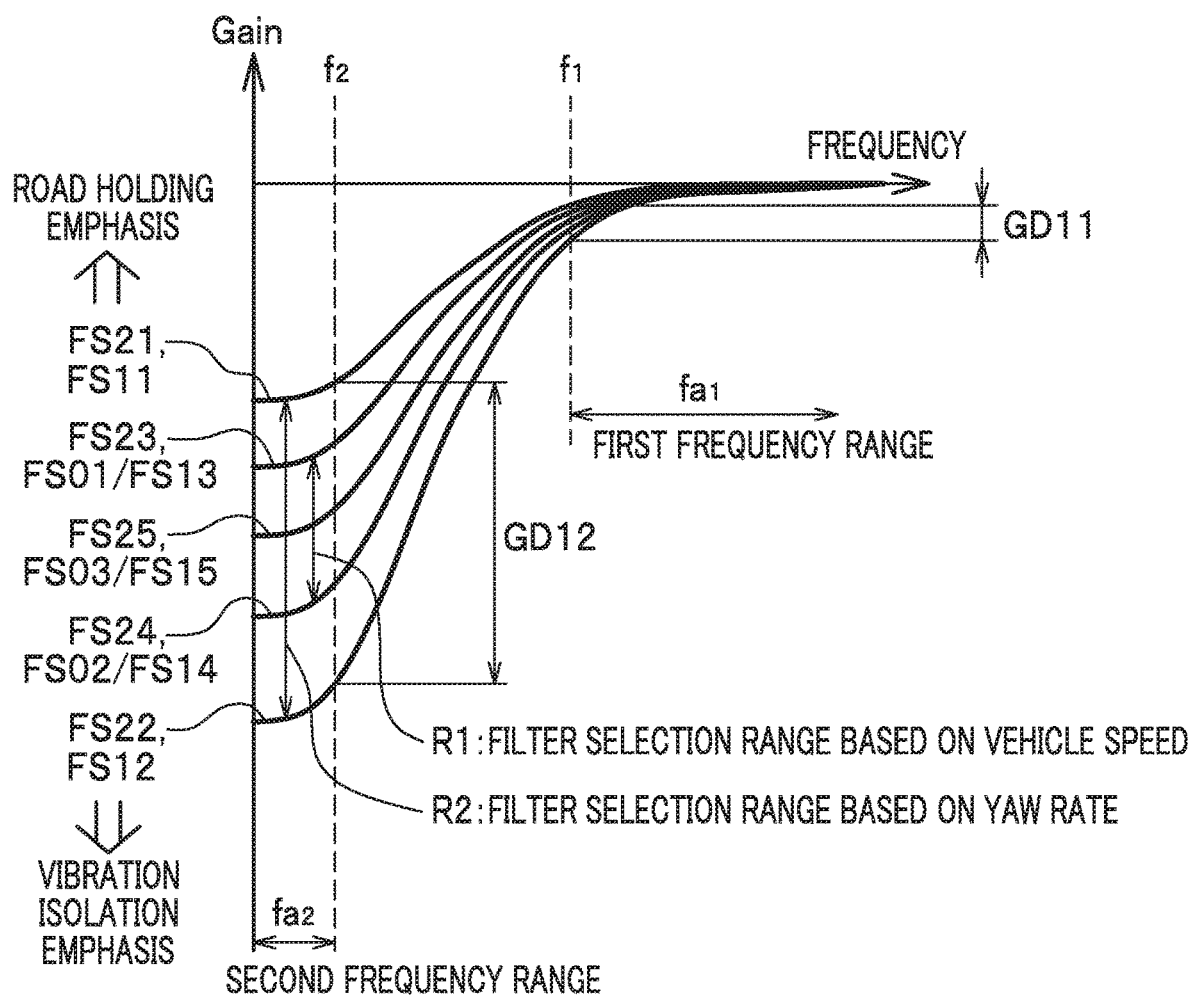
FIG. 7B is an explanatory diagram showing gain characteristics with respect to frequencies individually set for each of a plurality of filters selected based on the vehicle speed and the yaw rate.

Internal Configuration of ECU 15C Included in Electromagnetic Suspension Apparatus 11 According to Third Embodiment Next, an internal configuration of the ECU 15C included in the electromagnetic suspension apparatus 11 according to a third embodiment will be described with reference to FIGS. 7A, 7B. FIG. 7A is an internal configuration diagram of the ECU 15C included in the electromagnetic suspension apparatus 11 according to the third embodiment. FIG. 7B is an explanatory diagram showing gain characteristics with respect to frequencies individually set for each of the plurality of filters FS selected based on the vehicle speed V and the yaw rate (steering amount) Y. Here, the ECU 15C according to the third embodiment is configured by combining the ECU 15A according to the first embodiment and the ECU 15B according to the second embodiment. Therefore, the ECU 15C according to the third embodiment and the ECU 15A according to the first embodiment, the ECU 15B according to the second embodiment have many constituent elements common to both. Therefore, the ECU 15C according to the third embodiment will be described by focusing on different components between them.

In the filter setting unit 43A of the ECU 15A according to the first embodiment, the filter selection map 44A (see FIG. 4A) based on the vehicle speed V is stored as the relationship information on the filter characteristics suitable for the change in the vehicle speed V. Further, in the filter setting unit 43B of the ECU 15B according to the second embodiment, the filter selection map 44B (see FIG. 6A) based on the yaw rate Y is stored as the relationship information on the filter characteristics suitable for the change of the yaw rate Y (instead of the vehicle speed V). In contrast, in the filter setting unit 43C of the ECU 15C according to the third embodiment, both the filter selection map 44A (see FIG. 4A) based on the vehicle speed V and the filter selection map 44B (see FIG. 6A) based on the yaw rate Y are stored.

Further, in the filter setting unit 43B of the ECU 15B according to the second embodiment, FIG. 6B shows as an example five filters in total including the eleventh filter FS11, the twelfth filter FS12, the thirteenth filter FS13, the fourteenth filter FS14 and the fifteenth FS15 as the plurality of filters FS registered in advance in the ECU 15B.

In contrast, in the filter setting unit 43C of the ECU 15C according to the third embodiment, the five filters in total corresponding to the plurality of filters FS registered in advance in the ECU 15B according to the second embodiment are exemplified as the plurality of filters FS registered in advance in the ECU 15C. That is, in the ECU 15C according to the third embodiment, FIG. 7B shows as an example the five filters in total including a twenty-first filter FS21, a twenty-second filter FS22, a twenty-third filter FS23, a twenty-fourth filter FS24, and a twenty-fifth filter FS25 as the plurality of filters FS registered in advance in the ECU 15C.

A correspondence relationship between the plurality of filters FS registered in advance in the ECU 15C according to the third embodiment and the plurality of filters FS registered in advance in the ECU 15B according to the second embodiment are as follows. That is, as shown in FIG. 7B, among the plurality of filters FS registered in advance in the ECU 15C according to the third embodiment, the twenty-first filter FS21 corresponds to the eleventh filter FS11, the twenty-second filter FS22 corresponds to the twelfth filter FS12, the twenty-third filter FS23 corresponds to the thirteenth filter FS13, the twenty-fourth filter FS24 corresponds to the fourteenth filter FS14, and the twenty-fifth filter FS25 corresponds to the fifteenth filter FS15.

Further, a correspondence relationship between the plurality of filters FS registered in advance in the ECU 15C according to the third embodiment and the plurality of filters FS registered in advance in the ECU 15A according to the first embodiment is as follows. That is, as shown in FIG. 7B, among the plurality of filters FS registered in advance in the ECU 15C according to the third embodiment, the twenty-third filter FS23 corresponds to the first filter FS01, the twenty-fourth filter FS24 corresponds to the second filter FS02, and the twenty-fifth filter FS25 corresponds to the third filter FS03.

It should be noted here that a filter selection range R2 based on the yaw rate Y is set wider in a gain adjustment range than a filter selection range R1 based on the vehicle speed V, as shown in FIG. 7B. This is based on the fact that the change in the yaw rate Y is more closely related to the road holding performance (influence on the road holding performance is greater) than the change in the vehicle speed V.

Specifically, as shown in FIG. 7B, the individual gain characteristics are respectively set in the twenty-first to the twenty-fifth filters FS21, FS22, FS23, FS24, FS25 so that the gain is higher in the first frequency range fa1 exceeding the unsprung resonance frequency f1 than in the frequency range not higher than the unsprung resonance frequency f1, and the gain is lower in the second frequency range fa2, which is lower than the sprung resonance frequency f2 lower than the unsprung resonance frequency f1, than the frequency range not lower than the sprung resonance frequency f2.

The gain characteristic of the twenty-first filter FS21 is set to be higher than the gain characteristics of the twenty-second to twenty-fifth filters FS22, FS23, FS24, FS25 over the entire frequency range. Similarly, the gain characteristic of the 23rd filter FS23 is set to be higher than the gain characteristics of the 22nd filter FS22, the 24th to 25th filters FS24, FS25 over the entire frequency range. In short, the twenty-first filter FS21 and the twenty-third filter FS23 have the road holding emphasis type gain characteristics. Because the twenty-first filter FS21 and the twenty-third filter FS23 have higher gains (damping forces) than the intermediate type twenty-fifth filter FS25 particularly in the second frequency range fa2 lower than the sprung resonance frequency f2, and are excellent in road holding performance (steering stability) of the vehicle wheel.

On the other hand, the twenty-second filter FS22 and the twenty-fourth filter FS24 have the vibration isolation emphasis type gain characteristics. Because the twenty-second filter FS22 and the twenty-fourth filter FS24 have lower gains (damping forces) than the intermediate type twenty-fifth filter FS25 particularly in the second frequency range fa2 lower than the sprung resonance frequency f2, and are excellent in vibration isolation performance (ride comfort) to the vehicle body.

As shown in FIG. 7B, the gain difference GD12 between the twenty-first filter FS21 and the twenty-second filter FS22 in the second frequency range fa2 is larger than the gain difference GD11 between the twenty-first filter FS21 and the twenty-second filter FS22 in the first frequency range fa1.

Operation of Electromagnetic Suspension Apparatus 11 According to Third Embodiment Next, the operation of the electromagnetic suspension device 11 according to the third embodiment of the present invention will be described with reference to FIGS. 5A, 5B.

In Step S11 shown in FIG. 5A, the information acquisition unit 42 of the ECU 15C acquires the rotation angle signal of the electric motor 31 detected by the resolver 37 as information on the stroke position. Further, the information acquisition unit 42 acquires the information on the vehicle speed V detected by the vehicle speed sensor 40 and the yaw rate Y detected by the yaw rate sensor 42. The information on the vehicle speed V and the yaw rate Y acquired by the information acquisition unit 42 is sent to the filter setting unit 43C.

In Step S12, the information acquisition unit 42 of the ECU 15C calculates the stroke speed by time-differentiating the information on the stroke position acquired in Step S11. The information on the stroke speed calculated in this way is sent to the filter processing unit 45C.

In Step S13, the filter setting unit 43C of the ECU 15C selectively sets a filter having characteristics suitable for the vehicle speed V and the yaw rate Y at that time based on the information of the yaw rate Y acquired in Step S11, the filter selection map 44A (see FIG. 4A) based on the vehicle speed V, and the filter selection map 44B (see FIG. 6A) based on the yaw rate Y. The filter information set by the filter setting unit 43C is sent to the filter processing unit 45C.

Here, the filter setting process (Step S13) performed by the filter setting unit 43C of the ECU 15C will be described with reference to FIG. 5B. In Step S21 shown in FIG. 5B, the filter setting unit 43C of the ECU 15C acquires the information of the vehicle speed V and the yaw rate Y acquired in Step S11 as information on the state quantity of the vehicle 10.

In Step S22, the filter setting unit 43C of the ECU 15C selects filters having characteristics suitable for the vehicle speed V and the yaw rate Y, which are the state quantities of the vehicle 10, from among the plurality of filters FS having individual gain characteristics respectively set thereto. Here, when the filter selected based on the vehicle speed V and the filter selected based on the yaw rate Y are common filters, the subsequent processing is performed by dealing with the common filter as the selected filter.

On the other hand, when a filter selected based on the vehicle speed V and a filter selected based on the yaw rate Y are filters having mutually different characteristics, how to select one filter is a problem. As a method of selecting one filter in such a case, one of the following two may be adopted. A first method is to preferentially select the filter selected based on the yaw rate Y to the filter selected based on the vehicle speed V. This is based on an idea that the yaw rate Y is more closely related to the road holding performance (influence on the road holding performance is larger) than the vehicle speed V. A second method is to preferentially select a filter having a characteristic more emphasizing the road holding performance (larger gain) among the filter selected based on the vehicle speed V and the filter selected based on the yaw rate Y. This is based on an idea that the road holding performance (steering stability) is more important than the vibration isolation performance (ride comfort). The subsequent processing is performed by dealing with the filter selected by one of the two methods as the selected filter.

In Step S23, the filter setting unit 43C of the ECU 15C compares information on the currently set filter type and the filter type selected in Step S22 side by side, and determines based on the comparison result whether setting of the filter selected in Step S22 is the change from the vibration isolation emphasis type to the road holding emphasis type. As a result of this determination, when it is determined that the change from the vibration isolation emphasis type to the road holding emphasis type is made, the filter setting unit 43C of the ECU 15C allows the process flow to proceed to next Step S24. On the other hand, when it is determined that the change from the vibration isolation emphasis type to the road holding emphasis type is not made, the filter setting unit 43C of the ECU 15C allows the process flow to jump to Step S25. When the type of filter currently set and the type of filter selected in Step S22 are the same, it satisfies the condition that "the change from the vibration isolation emphasis type to the road holding emphasis type is not made".

In Step S24, when it is determined that the change from the vibration isolation emphasis type to the road holding emphasis type is made, the filter setting unit 43C of the ECU 15C performs a quick setting to quickly set the filter selected in Step S 22 without delay. Thereafter, the ECU 15C terminates the filter setting process, and advances the process flow to next Step S14.

On the other hand, in Step S25, when it is determined that the change from the vibration isolation emphasis type to the road holding emphasis type is not made, the filter setting unit 43C of the ECU 15C performs the slow setting to slowly set the filter selected in Step S22 with a predetermined delay time. Thereafter, the ECU 15C terminates the filter setting process of Step S13 and advances the process flow to next Step S14.

In Step S14, the filter processing unit 45C of the ECU 15C performs the filtering process for applying the gain characteristic (high-pass characteristic) for the frequency of the filter set in Step S24 or S25 on the time series signal of the stroke speed calculated (acquired) in Step S12, so as to output the stroke speed signal after the filtering process in which the gain is corrected to the frequency characteristic suitable for the vehicle speed V and the yaw rate Y at that time. The stroke speed signal after the filtering process by the filter processing unit 45B is sent to the driving force calculation unit 47.

In Step S15, the driving force calculation unit 47 of the ECU 15C inputs the stroke speed signal after the filtering process in Step S14, and calculates the drive control signal including the target drive control current value with reference to the stroke speed signal and the damping force map 46.

In Step S16, the drive control unit 49 of the ECU 15C supplies the drive control power to the electric motor 31 provided in each of the plurality of electromagnetic actuators 13 in accordance with the drive control signal calculated in Step S15, to control driving of the plurality of electromagnetic actuators 13.

Operational Effect of Electromagnetic Suspension Apparatus 11 According to Third Embodiment According to the electromagnetic suspension apparatus 11 of the third embodiment, it is possible to finely set the filter according to the level of the vehicle speed V and the yaw rate Y as the state quantity of the vehicle so as to obtain the effect that the road holding performance (steering stability) is secured by maintaining a relatively high gain as the gain characteristic of the filter in the first frequency range fa1 exceeding the unsprung resonance frequency f1 (about 10 to 13 Hz), while the vibration isolation performance (ride comfort) is obtained by making the gain characteristic of the filter adjustable over a wide range in the second frequency range fa2 lower than the sprung resonance frequency f2 (about 0.8 to 2 Hz). As a result, it is possible to obtain both the vibration isolation performance of the sprung member (such as the vehicle body) and the road holding performance of the unsprung member (such as the wheel) at a high level according to the motion state of the vehicle 10 (level of vehicle speed V and yaw rate Y) which fluctuates every moment. Further, when the filter selected based on the vehicle speed V and the filter selected based on the yaw rate Y are filters having mutually different characteristics, it is possible to realize excellent road holding performance (steering stability) by adopting the method of preferentially selecting the filter selected based on the yaw rate Y to the filter selected based on the vehicle speed V. Furthermore, when the filter selected based on the vehicle speed V and the filter selected based on the yaw rate Y are filters having mutually different characteristics, it is also possible to realize excellent road holding performance (steering stability) as described above by adopting the method of preferentially selecting the filter having a characteristic more emphasizing the road holding performance.

Operational Effect of Electromagnetic Suspension Apparatus 11 According to the Present Invention The electromagnetic suspension apparatus 11 according to a first aspect of the present invention includes the electromagnetic actuator 13 provided between the vehicle body and the wheel of the vehicle 10 and generating the driving force related to vibration damping of the vehicle body, the information acquisition unit 42 that acquires information on the stroke speed of the electromagnetic actuator 13 and the state quantity (vehicle speed V and yaw rate V) of the vehicle 10, the plurality of filters FS having gain characteristics with respect to frequency and set to have gain characteristics in which the gain at the sprung resonance frequency $f_2$ is lower than that at the unsprung resonance frequency $f_1$, the filter setting unit 43 that selectively sets the filter having the predetermined gain characteristic from among the plurality of filters FS based on the state quantity of the vehicle 10 acquired by the information acquisition unit 42, the filter processing unit 45 that performs a filtering process on the stroke speed of the electromagnetic actuator 13 acquired by the information acquisition unit 42 using the filter set by the filter setting unit 43, and the drive control unit 49 that controls the driving of the electromagnetic actuator 13 based on the stroke speed after the filtering process by the filter processing unit 45 and relationship information between the stroke speed after the filtering process and a damping force. The gain characteristics of the plurality of filters FS are set so that differences between the gain at the sprung resonance frequency $f_2$ and the gain at the unsprung resonance frequency $f_1$ are different from each other.

With the electromagnetic suspension apparatus 11 according to the first aspect of the present invention, it is possible to finely set the filter according to the level of the state quantity (vehicle speed V and yaw rate Y) of the vehicle so as to obtain the effect that the road holding performance (steering stability) is secured by maintaining a relatively high gain as the gain characteristic of the filter in the vicinity of the unsprung resonance frequency f1 (about 10 to 13 Hz), while the vibration isolation performance (ride comfort) is obtained by making the gain characteristic of the filter adjustable over a wide range in the vicinity of the sprung resonance frequency f2 (about 0.8 to 2 Hz). As a result, it is possible to obtain both the vibration isolation performance of the sprung member (such as the vehicle body) and the road holding performance of the unsprung member (such as the wheel) at a high level according to the motion state of the vehicle 10 (level of vehicle speed V and yaw rate Y) which fluctuates every moment.

It should be noted that the electromagnetic suspension apparatus 11 according to the first aspect of the present invention includes the following plural modes in the technical range. That is, they are a mode in which the gain characteristic diagrams set in the plurality of filters FS partially intersect each other, a mode in which any of the plurality of filters FS has a gain characteristic such that the gain decreases as the frequency increases in the first frequency range fa1 exceeding the unsprung resonance frequency f1, and a mode in which any of the plurality of filters FS has a gain characteristic such that the gain increases as the frequency decreases in the second frequency range fa2 lower than the sprung resonance frequency f2.

Further, the electromagnetic suspension apparatus 11 according to a second aspect is the electromagnetic suspension apparatus 11 according to the first aspect, and may be configured such that the filter setting unit 43 selectively sets the filter having a gain characteristic suitable for the state quantity of the vehicle 10 among the plurality of filters FS based on the state quantity of the vehicle 10 acquired by the information acquisition unit 42.

On the other hand, the electromagnetic suspension apparatus 11 according to a third aspect of the present invention includes the electromagnetic actuator 13 provided between the vehicle body and the wheel of the vehicle 10 and generating the driving force related to vibration damping of the vehicle body, the information acquisition unit 42 that acquires information on the stroke speed of the electromagnetic actuator 13 and the state quantity (vehicle speed V and yaw rate V) of the vehicle 10, the plurality of filters FS having gain characteristics in which the gain is higher in the first frequency range fa1 exceeding the unsprung resonance frequency f1 than in the frequency range not higher than the unsprung resonance frequency f1, and the gain is lower in the second frequency range fa2, which is lower than the sprung resonance frequency f2 lower than the unsprung resonance frequency f1, than the frequency range not lower than the sprung resonance frequency f2, the filter setting unit 43 that selectively sets the filter having the gain characteristic suitable for the state quantity of the vehicle 10 from among the plurality of filters FS based on the state quantity of the vehicle 10 acquired by the information acquisition unit 42 and relationship information 44A, 44B of the filter characteristics suitable for the state quantity of the vehicle 10, the filter processing unit 45 that performs a filtering process on the frequency component related to the stroke speed of the electromagnetic actuator 13 acquired by the information acquisition unit 42 using the filter set by the filter setting unit 43, and the drive control unit 49 that controls the driving of the electromagnetic actuator 13 based on the stroke speed after the filtering process by the filter processing unit 45 and the relationship information between the stroke speed and a damping force varying in response to variation of the stroke speed. The plurality of filters FS includes at least first filters FS01, FS11, FS21 having road holding emphasis type gain characteristics and second filters FS02, FS12, FS22 having vibration isolation emphasis type gain characteristics, the gain characteristics of the first filters FS01, FS11, FS21 are higher than the gain characteristics of the second filters FS02, FS12, FS22, and the gain differences GD02, GD12 between the first filter and the second filter in the second frequency range fa2 are larger than the gain differences GD01, GD11 between the first filter and the second filter in the first frequency range fa1.

With the electromagnetic suspension apparatus 11 according to the third aspect of the present invention, it is possible to finely set the filter according to the level of the state quantity (vehicle speed V and yaw rate Y) of the vehicle so as to obtain the effect that the road holding performance (steering stability) is secured by maintaining a relatively high gain as the gain characteristic of the filter in the first frequency range fa1 exceeding the unsprung resonance frequency f1 (about 10 to 13 Hz), while the vibration isolation performance (ride comfort) is obtained by making the gain characteristic of the filter adjustable over a wide range in the second frequency range fa2 lower than the sprung resonance frequency f2 (about 0.8 to 2 Hz). As a result, it is possible to obtain both the vibration isolation performance of the sprung member (such as the vehicle body) and the road holding performance of the unsprung member (such as the wheel) at a high level according to the motion state of the vehicle 10 (level of vehicle speed V and yaw rate Y) which fluctuates every moment.

The electromagnetic suspension apparatus 11 according to a fourth aspect is the electromagnetic suspension apparatus 11 according to the first aspect, and may be configured such that when the filter setting unit 43 selectively sets the filter having the predetermined gain characteristic from among the plurality of filters FS, the filter setting unit 43 compares information on the type of the currently set filter and the type of the selected filter, and sets the selected filter based on this comparison result, and then determines whether it is a change from a vibration isolation emphasis type filter to a road holding emphasis type filter, and as a result of this determination, when it is determined that it is not the change from the vibration isolation emphasis type filter to the road holding emphasis type filter, the filter setting unit 43 performs a slow setting for slowly setting the selected filter with a predetermined delay time.

Further, the electromagnetic suspension apparatus 11 according to a fifth aspect is the electromagnetic suspension apparatus 11 according to the second or third aspect, and may be configured such that when the filter setting unit 43 selectively sets the filter having the gain characteristic suitable for the state quantity (vehicle speed V and yaw rate Y) of the vehicle 10 from among the plurality of filters FS, the filter setting unit 43 compares information on the type of the currently set filter and the type of the selected filter, and sets the selected filter based on this comparison result, and then determines whether it is a change from a vibration isolation emphasis type filter to a road holding emphasis type filter, and as a result of this determination, when it is determined that it is not the change from the vibration isolation emphasis type filter to the road holding emphasis type filter, the filter setting unit 43 performs a slow setting for slowly setting the selected filter with a predetermined delay time.

In the electromagnetic suspension apparatus 11 according to the fourth or fifth aspect, the filter setting unit 43 sets the filter selected from among the plurality of filters FS, determines whether it is a change from a vibration isolation emphasis type filter to a road holding emphasis type filter, and as a result of this determination, when it is determined that it is the change from the vibration isolation emphasis type filter to the road holding emphasis type filter, the filter setting unit 43 performs a quick setting for quickly setting the selected filter, and when it is determined that it is not the change from the vibration isolation emphasis type filter to the road holding emphasis type filter, the filter setting unit 43 performs a slow setting for slowly setting the selected filter with a predetermined delay time. Here, the case of changing from the vibration isolation emphasis type to the road holding emphasis type is a case where a request to quickly set the filter selected to secure the steering stability is strong, for example, when the vehicle 10 is traveling at high speed and turning. On the other hand, the case of not changing from the vibration isolation emphasis type to the road holding emphasis type is a case where a request to quickly set the selected filter is not so strong, for example, when the vehicle 10 is traveling straight in compliance with the speed limit. With the electromagnetic suspension apparatus 11 according to the fourth or fifth aspect, since the request for improving the road holding performance for the unsprung member is prioritized over the request for improving the vibration isolation performance for the sprung member, it is possible to contribute behavior stabilization of the vehicle 10. Prior to obtaining the target damping force based on the relationship information between the stroke speed and the damping force changing according to the change in the stroke speed, since the characteristic of the stroke speed is changed by applying the filter selected to be suitable for the state amount of the vehicle 10 to the time series signal of the stroke speed, it is possible to set an adjustment amount of the damping force characteristic in the vicinity of the sprung resonance frequency $f2$ larger than an adjustment amount of the damping force characteristic in the vicinity of the unsprung resonance frequency $f1$. As a result, it is possible to largely adjust the vibration isolation performance for the sprung member while ensuring the road holding performance for the unsprung member to some extent.

An electromagnetic suspension apparatus 11 according to a sixth aspect is the electromagnetic suspension apparatus 11 according to any one of the first to fifth aspects, and may be configured such that the state quantity of the vehicle 10 includes the vehicle speed V and the yaw rate (steering amount) Y, and the filter selection range R2 based on the yaw rate Y is set wider than the filter selection range R1 based on the vehicle speed V.

With the electromagnetic suspension apparatus 11 according to the sixth aspect, since the filter selection range R2 (see FIG. 7B) based on the yaw rate Y is set wider than the filter selection range R1 (see FIG. 7B) based on the vehicle speed V, it is possible to realize both of the vibration isolation performance for the sprung member and the road holding performance for the unsprung member according to an idea that the yaw rate Y is more closely related to the road holding performance (influence on the road holding performance is greater) than the vehicle speed V.

Other Embodiments

The plural embodiments described above are examples of implementation of the present invention. Therefore, the technical scope of the present invention should not be interpreted limitedly by these. This is because the present invention can be implemented in various forms without departing from the spirits and scope of the present invention.

For example, in the description of the internal configuration of the ECU 15 commonly provided in the electromagnetic suspension apparatus 11 according to the first to third embodiments of the present invention, an example of the information acquisition unit 42 that acquires the information on the stroke speed, the vehicle speed V, and the yaw rate Y has been described, however, the present invention is not limited to this example. The information acquisition unit may be the information acquisition unit 42 (corresponding to the first embodiment) that acquires information on the stroke speed and the vehicle speed V, or the information acquisition unit 42 (corresponding to the second embodiment) that acquires the information on the stroke speed and the yaw rate Y.

In the description of the internal configuration of the ECU 15 commonly provided in the electromagnetic suspension apparatus 11 according to the first to third embodiments of the present invention, an example of the filter setting unit 43 that selectively sets the filter having the gain characteristic suitable for the vehicle speed V and yaw rate Y at that time from among the plurality of filters FS having individual gain characteristics respectively set thereto, based on the information of the vehicle speed V and the yaw rate Y acquired by the information acquisition unit 42 and the filter selection map, has been described, however, the present invention is not limited to this example. The filter setting unit may be the filter setting unit 43A (corresponding to the first embodiment) that selectively sets the filter having characteristics suitable for the vehicle speed V at that time based on the information of the vehicle speed V acquired by the information acquisition unit 42 and the filter selection map 44A, or the filter setting unit 43B (corresponding to the second embodiment) that selectively sets the filter suitable for the yaw rate Y at that time based on the information of the yaw rate Y acquired by the information acquisition unit 42 and the filter selection map 44B.

In the description of the embodiment according to the present invention, three types of the filters (first filter FS01, second filter FS02, third filter FS03) have been exemplified as the plurality of filters FS selected by using the filter selection map 44A (see FIG. 4A) based on the vehicle speed V, however, the present invention is not limited to this example. An arbitrary number of filters FS can be used as the plurality of filters FS selected by using the filter selection map 44A based on the vehicle speed V.

In the description of the embodiment according to the present invention, five types of the filters (eleventh filter FS11, twelfth filter FS12, thirteenth filter FS13, fourteenth filter FS14, fifteenth filter FS15) have been exemplified as the plurality of filters FS selected by using the filter selection map 44B (see FIG. 6A) based on the yaw rate Y, however, the present invention is not limited to this example. An arbitrary number of filters FS can be used as the plurality of filters FS selected by using the filter selection map 44B based on the yaw rate Y.

Further, in the description of the embodiment according to the present invention, although the yaw rate Y is exemplified as a parameter corresponding to the steering amount, the present invention is not limited to this example. As a parameter corresponding to the steering amount, it is possible to use a lateral G-force, a steering angle, a steering angular velocity, a steering torque, a rotation angle/rotation angular velocity of an assist motor used in an electric power steering apparatus, or any combination of these.

In the description of the embodiment according to the present invention, the vehicle speed V and the yaw rate Y are exemplified as the state quantity of the vehicle 10, and an example, in which the degree of the request related to the road holding performance/vibration isolation performance is grasped according to the state quantity of the vehicle 10, and the filter having the gain characteristic suitable for the degree of the request is selectively set from among the plurality of filters FS having individual gain characteristics respectively set thereto, has been described, however, the present invention may be implemented in the following mode. That is, for example, a stroke signal (stroke amount/stroke speed) of the front wheel may be used as the state quantity of the vehicle 10 used for grasping the degree of the request related to the road holding performance/vibration isolation performance. In this case, the stroke amount, the stroke speed, or the like occurring in the rear wheel in the future is estimated based on the stroke signal of the front wheel, and based on the estimation result, the degree of the request on the road holding performance/vibration isolation performance in the rear wheel can be grasped. Further, road surface information (rough road surface or good road without irregularities) in a traveling direction of the vehicle 10 may be used as the state quantity of the vehicle 10 used for grasping the degree of the request related the road holding performance/vibration isolation performance. In this case, the stroke amount, the stroke speed, or the like occurring in the wheel in the future is estimated based on the road surface information in the traveling direction of the vehicle 10, and based on the estimation result, the degree of the request on the road holding performance/vibration isolation performance in the wheel can be grasped. When acquiring the road surface information in the traveling direction of the vehicle 10, for example, an in-vehicle camera that images the road surface in the traveling direction of the vehicle 10 can be used. Further, the road surface information in the traveling direction of the vehicle 10 can be also acquired by acquiring other vehicle information such as the stroke amount and the stroke speed generated on the wheel of the other vehicle from the other vehicle traveling in front of the vehicle 10 by inter-vehicle communication. Further, the road surface information in the traveling direction of the vehicle 10 can be also acquired by acquiring the road surface information of the road, on which the vehicle is currently traveling, from a communication device provided on the road on which the vehicle 10 is traveling, by road-to-vehicle communication. Further, it is also possible to accumulate the road surface information related to the road on which the vehicle has traveled in a storage device provided in a navigation device or the like mounted on the vehicle 10 as a travel history, and to acquire the road surface information related to the road by reading the travel history when traveling on the road next time. The road surface information as the travel history may be shared with other vehicles. In this case, it is also possible to acquire the road surface information of the road on which the vehicle is currently traveling, by reading the travel history of the other vehicles.

Moreover, acceleration/deceleration and pitch rate of the vehicle 10 may be used as the state quantity of the vehicle 10 used for grasping the degree of the request related to the road holding performance/vibration isolation performance. In this case, even when the vehicle 10 is traveling at a constant vehicle speed V, it is possible to realize a filter selection function considering the road holding performance requirement for each of the front wheels and the rear wheels suitable for the motion state of the vehicle 10 in acceleration or in deceleration. As a result, it is possible to balance the road holding performance and the vibration isolation performance more finely. Further, lateral acceleration and roll rate of the vehicle 10 can be used as the state quantity of the vehicle 10 used for grasping the degree of the request related to the road holding performance/vibration isolation performance. In this case, even when the vehicle 10 is turning at a constant steering amount (yaw rate Y), it is possible to realize the filter selection function suitable for a turning state of the vehicle 10 considering the road holding performance requirement for inner wheels and outer wheels during turning. As a result, it is possible to balance the road holding performance and the vibration isolation performance more finely.

Further, in the description of the embodiment according to the present invention, an example in which a total of four electromagnetic actuators 13 are arranged in both the front wheels (left front wheel/right front wheel) and the rear wheels (left rear wheel/right rear wheel) has been described, however, the present invention is not limited to this example. A configuration in which two electromagnetic actuators 13 are conveniently arranged in either the front wheel or the rear wheel may be adopted.

Finally, in the description of the embodiment according to the present invention, the drive control unit 49 that independently controls the driving of the plurality of electromagnetic actuators 13 has been described. Specifically, the drive control unit 49 may independently control the driving of the electromagnetic actuators 13 respectively provided in the four wheels, separately for wheels. Further, the drive control unit 49 may independently control the driving of the electromagnetic actuators 13 respectively provided for the four wheels, separately for the front wheels and for the rear wheels, or separately for the left wheels and the right wheels.

REFERENCE SIGNS LIST

10: vehicle
11: electromagnetic suspension apparatus
13: electromagnetic actuator
42: information acquisition unit
43: filter setting unit
45: filter processing unit
49: drive control unit
FS: plurality of filters
FS01, FS11, FS21: first filter, eleventh filter, twenty-first filter (first filters)
FS02, FS12, FS22: second filter, twelfth filter, twenty-second filter (second filters)
fa1: first frequency range
fa2: second frequency range
GD01, GD11: gain difference between first filter and second filter in first frequency range fa1
GD02, GD12: gain difference between first filter and second filter in second frequency range fa2
R1: filter selection range based on vehicle speed V
R2: filter selection range based on yaw rate Y
V: vehicle speed
Y: yaw rate (steering amount)

The invention claimed is:
1. An electromagnetic suspension apparatus comprising:
an electromagnetic actuator provided between a vehicle body and a wheel of a vehicle and generating a driving force related to vibration damping of the vehicle body; and
an electronic control unit in communication with the electromagnetic actuator, the electronic control unit configured to include:
an information acquisition unit that acquires information on a stroke speed of the electromagnetic actuator and a state quantity of the vehicle;
a filter setting unit that selectively sets a filter having a predetermined gain characteristic from among a plurality of filters based on the state quantity of the vehicle acquired by the information acquisition unit, the plurality of filters having gain characteristics with respect to frequency and set to have gain characteristics in which a gain at a sprung resonance frequency is lower than that at an unsprung resonance frequency;
a filter processing unit that performs a filtering process on the stroke speed acquired by the information acquisition unit using the filter set by the filter setting unit; and
a drive control unit that controls driving of the electromagnetic actuator based on the stroke speed after the filtering process is performed by the filter processing unit and relationship information of a damping force that changes according to a change in the stroke speed,
wherein
the gain characteristics of the plurality of filters are set so that differences between the gain at the sprung reso- nance frequency and the gain at the unsprung resonance frequency are different from each other.

2. The electromagnetic suspension apparatus according to claim 1, wherein
the filter setting unit selectively sets a filter having a gain characteristic suitable for the state quantity of the vehicle from among the plurality of filters based on the state quantity of the vehicle acquired by the information acquisition unit.

3. The electromagnetic suspension apparatus according to claim 1, wherein
when the filter setting unit selectively sets the filter having the predetermined gain characteristic from among the plurality of filters, the filter setting unit compares information on the type of the currently set filter and the type of the selected filter, and sets the selected filter based on this comparison result, and then determines whether it is a change from a vibration isolation emphasis type filter to a road holding emphasis type filter, and as a result of this determination, when it is determined that it is the change from the vibration isolation emphasis type filter to the road holding emphasis type filter, the filter setting unit performs a quick setting for quickly setting the selected filter, on the other hand, when it is determined that it is not the change from the vibration isolation emphasis type filter to the road holding emphasis type filter, the filter setting unit performs a slow setting for slowly setting the selected filter with a predetermined delay time.

4. The electromagnetic suspension apparatus according to claim 1, wherein
the state quantity of the vehicle includes a vehicle speed and a steering amount, and
a filter selection range based on the steering amount is set wider than a filter selection range based on the vehicle speed.

5. An electromagnetic suspension apparatus comprising:
an electromagnetic actuator arranged in parallel with a spring member provided between a vehicle body and a wheel of a vehicle and generating a driving force related to vibration damping of the vehicle body; and
an electronic control unit in communication with the electromagnetic actuator, the electronic control unit configured to include:
an information acquisition unit that acquires information on a stroke speed of the electromagnetic actuator and a state quantity of the vehicle;
a plurality of filters in which individual gain characteristics are respectively set so that a gain characteristic is higher in a first frequency range exceeding an unsprung resonance frequency than a gain characteristic in a frequency range not exceeding the unsprung resonance frequency, and the gain characteristic is lower in a second frequency range, which is lower than the sprung resonance frequency lower than the unsprung resonance frequency, than the gain characteristic in a frequency range not lower than the sprung resonance frequency;
a filter setting unit that selectively sets a filter having a gain characteristic suitable for the state quantity of the vehicle from among a plurality of filters based on relationship information between the state quantity of the vehicle acquired by the information acquisition unit and a filter characteristic suitable for the state quantity of the vehicle, the plurality of filters having individual gain characteristics which are respectively set so that a gain characteristic is higher in a first frequency range exceeding an unsprung resonance frequency than a gain characteristic in a frequency range not exceeding the unsprung resonance frequency, and the gain characteristic is lower in a second frequency range, which is lower than the sprung resonance frequency lower than the unsprung resonance frequency, than the gain characteristic in a frequency range not lower than the sprung resonance frequency;
a filter processing unit that performs a filtering process on a frequency component related to the stroke speed of the electromagnetic actuator acquired by the information acquisition unit using the filter set by the filter setting unit; and
a drive control unit that controls driving of the electromagnetic actuator based on relationship information between the stroke speed after the filtering process by the filter processing unit and a damping force which changes according to a change in the stroke speed, wherein
the plurality of filters include at least a first filter having a road holding emphasis type gain characteristic and a second filter having a vibration isolation emphasis type gain characteristic,
the gain characteristic of the first filter is higher than the gain characteristic of the second filter, and
a difference between gains of the first filter and the second filter in the second frequency range is larger than a difference between gains of the first filter and the second filter in the first frequency range.

6. The electromagnetic suspension apparatus according to claim 5, wherein
when the filter setting unit selectively sets the filter having the gain characteristic suitable for the state quantity of the vehicle from among the plurality of filters, the filter setting unit compares information on the type of the currently set filter and the type of the selected filter, and sets the selected filter based on this comparison result, and then determines whether it is a change from a vibration isolation emphasis type filter to a road holding emphasis type filter, and as a result of this determination, when it is determined that it is the change from the vibration isolation emphasis type filter to the road holding emphasis type filter, the filter setting unit performs a quick setting for quickly setting the selected filter, on the other hand, when it is determined that it is not the change from the vibration isolation emphasis type filter to the road holding emphasis type filter, the filter setting unit performs a slow setting for slowly setting the selected filter with a predetermined delay time.

* * * * *